US011200483B2

United States Patent
Hwang et al.

(10) Patent No.: US 11,200,483 B2
(45) Date of Patent: Dec. 14, 2021

(54) MACHINE LEARNING METHOD AND APPARATUS BASED ON WEAKLY SUPERVISED LEARNING

(71) Applicant: Lunit Inc., Seoul (KR)

(72) Inventors: Sang Heum Hwang, Seoul (KR); Hyo Eun Kim, Seongnam-si (KR)

(73) Assignee: LUNIT INC., Seoul (KR)

( * ) Notice: Subject to any disclaimer, the term of this patent is extended or adjusted under 35 U.S.C. 154(b) by 677 days.

(21) Appl. No.: 15/378,001

(22) Filed: Dec. 13, 2016

(65) Prior Publication Data

US 2018/0060722 A1   Mar. 1, 2018

(30) Foreign Application Priority Data

Aug. 30, 2016 (KR) .......... 10-2016-0111111
Nov. 22, 2016 (KR) .......... 10-2016-0156041

(51) Int. Cl.
*G06N 3/04* (2006.01)
*G06N 3/08* (2006.01)

(52) U.S. Cl.
CPC .......... *G06N 3/0454* (2013.01); *G06N 3/084* (2013.01)

(58) Field of Classification Search
CPC ....... G06N 3/0454; G06N 3/084; Y04S 10/54
See application file for complete search history.

(56) References Cited

U.S. PATENT DOCUMENTS

| 5,052,043 | A | * | 9/1991 | Gaborski | G06N 3/084 382/157 |
| 5,333,239 | A | * | 7/1994 | Watanabe | G06N 3/084 706/25 |
| 5,517,598 | A | * | 5/1996 | Sirat | G06N 3/04 706/41 |
| 2003/0220889 | A1 | * | 11/2003 | Shi | G06N 3/063 706/26 |

(Continued)

FOREIGN PATENT DOCUMENTS

| KR | 10-2016-0032536 A | 3/2016 |
| KR | 10-1623431 B1 | 5/2016 |

OTHER PUBLICATIONS

Hoffman, Adaptive Learning Algorithms for Transferable Visual Recognition, Aug. 8, 2016 (Year: 2016).*

(Continued)

*Primary Examiner* — Omar F Fernandez Rivas
*Assistant Examiner* — Selene A. Haedi
(74) *Attorney, Agent, or Firm* — Lex IP Meister, PLLC

(57) ABSTRACT

A machine learning method based on weakly supervised learning according to an embodiment of the present invention includes extracting feature maps about a dataset given a first type of information and not given a second type of information by using a convolutional neural network (CNN), updating the CNN by back-propagating a first error value calculated as a result of performing a task corresponding to the first type of information by using a first model, and updating the CNN by back-propagating a second error value (Continued)

calculated as a result of performing the task corresponding to the first type of information by using a second model different from the first model, wherein the second type of information is extracted when the task corresponding to the first type of information is performed using the second model.

9 Claims, 20 Drawing Sheets

(56) References Cited

U.S. PATENT DOCUMENTS

| | | | |
|---|---|---|---|
| 2004/0247166 A1* | 12/2004 | Giger | G06F 19/321 382/128 |
| 2016/0078863 A1 | 3/2016 | Chung et al. | |
| 2017/0236271 A1 | 8/2017 | Kim et al. | |
| 2018/0047159 A1* | 2/2018 | Schlegl | G06K 9/6267 |

OTHER PUBLICATIONS

Schlegl, Predicting Semantic Descriptions from Medical Images with Convolutional Neural Networks, 2015 (Year: 2015).*

Durand, Weldon: Weakly Supervised Learning of Deep Convolutional Neural Networks, Jun. 2016 (Year: 2016).*

Shi, Weakly Supervised Learning of Objects and Attributes, Feb. 2016 (Year: 2016).*

Dymetman et al., "Log-Linear RNNs: Towards Recurrent Neural Networks with Flexible Prior Knowledge", Jul. 2016 (Year: 2016).*

An Office Action issued by the Korean Patent Office dated Mar. 29, 2018, which corresponds to Korean Patent Application 10-2016-0156041 and is related to U.S. Appl. No. 15/378,001.

Maxime Oquab et al., "Is object localization for free?—Weakly-supervised learning with convolutional neural networks", Retrieved from the Internet: http://leon.bottou.org/publications/pdf/cvpr-2015.pdf, Jun. 2016, 10 pages.

Bolei Zhou et al.,"Learning Deep Features for Discriminative Localization", Retrieved from the Internet: http://cnnlocalization.csail.mit.edu/ Zhou_Learning_Deep_Features_CVPR_2016_paper.pdf, Dec. 14, 2015, 9 pages.

An Office Action issued by the Korean Patent Office dated Sep. 20, 2017, which corresponds to Korean Patent Application 10-2016-0156041 and is related to U.S. Appl. No. 15/378,001.

Sangheum Hwang et al., "Self-Transfer Learning for Fully Weakly Supervised Object Localization", arXiv: 1602.01625v1 [cs.CV] Feb. 4, 2016, 9 pages.

Hyo-Eun Kim et al., "Deconvolutional Feature Stacking for Weakly-Supervised Semantic Segmentation", arXiv:1602.04984v3 [cs.CV] Mar. 12, 2016, 16 pages.

* cited by examiner

CONVENTIONAL OBJECT LOCALIZATION MODEL BASED ON WEAKLY SUPERVISED LEARNING (10B)

FIG. 16

| Testset | Shenzhen set | | | | MC set | | | |
|---|---|---|---|---|---|---|---|---|
| Task | Classification | | | Localization | Classification | | | Localization |
| Metric | Accu | AUC | AP(pos) | AP(neg) | AP | Accu | AUC | AP(pos) | AP(neg) | AP |
| MaxPool | 0.7855 | 0.8670 | 0.8920 | 0.8144 | 0.6982 | 0.7246 | 0.8047 | 0.8094 | 0.7971 | 0.6016 |
| AvePool | 0.7870 | 0.9069 | 0.9238 | 0.8879 | 0.6903 | 0.7029 | 0.7836 | 0.7522 | 0.8037 | 0.5119 |
| STL+MaxPool | 0.8338 | 0.9166 | 0.9340 | 0.9004 | 0.7867 | 0.7881 | 0.8631 | 0.8484 | 0.8853 | 0.7956 |
| STL+AvePool | 0.8369 | 0.9267 | 0.9427 | 0.9084 | 0.8715 | 0.8406 | 0.8899 | 0.8838 | 0.8916 | 0.8070 |

MACHINE LEARNING METHOD AND APPARATUS BASED ON WEAKLY SUPERVISED LEARNING

TECHNICAL FIELD

The present invention relates to a machine learning method and apparatus based on weakly supervised learning, and more particularly, to a method and apparatus for learning images and video using a convolutional neural network (CNN) in a weakly supervised learning environment.

BACKGROUND ART

Supervised learning is a learning strategy given an answer. It is based on the assumption that a right output for an input is available. Therefore, for supervised learning, when a dataset is learned, an answer about each piece of data that forms the dataset should be provided.

In a weakly supervised learning environment, however, information about a given answer is limited. Weakly supervised learning is different from unsupervised learning in which no information is given. However, since only some information is provided, ungiven information should be predicted by learning the given information. One example of weakly supervised learning is a learning model that predicts the location of an object in an image based on given class information of the object.

Meanwhile, convolutional neural networks (CNNs), as one of the deep learning algorithms, are showing good performance in various computer vision fields such as object classification, object localization and object segmentation.

For machine learning in the field of computer vision, a dataset including images and video should be labeled. Labeling is done to provide information about a dataset. Since the labeling task is usually performed using human resource, a lot of time and cost are consumed.

Therefore, for machine learning in an environment given a small amount of information, attempts are increasingly being made to perform a task in the computer vision field through CNN-based weakly supervised learning.

To perform a task in the computer vision field through CNN-based weakly supervised learning, a pre-trained network is generally required. Specifically, a CNN may be fine-tuned to extract good initial feature maps using a network pre-trained through a dataset which is similar but different from a dataset to be learned. This process is called transfer learning. Since the fine-tuned CNN is applied to a particular task, the CNN can be improved, and the ultimately intended particular task can be executed.

However, there are cases where a pre-trained network cannot be obtained. In the case of fields in which a large amount of data cannot be secured because only very limited data is available, a pre-trained network cannot be obtained. There are also cases where a pre-trained network cannot be applied. A pre-trained network currently widely used is a network trained using general images. Therefore, the network may not be able to show good performance if applied to images having different features from general images.

For example, it is difficult in the medical field to obtain a dataset large enough to be pre-learned due to the problem of personal privacy and the limited amount of data. In addition, since medical images have different features from general images, it is difficult to apply a network pre-trained using general images.

Therefore, in such fields, there is a need for a method and apparatus for learning a target dataset by oneself and performing an intended task without using a pre-trained network.

PRIOR ART DOCUMENT

Patent Document

KR 10-2016-0083127 A "METHOD AND SYSTEM FOR FACE IMAGE RECOGNITION"

DISCLOSURE

Technical Problem

An object of the present invention is to provide a method and apparatus for training oneself on a dataset to be learned and executing an intended task without using a pre-trained network.

Another object of the present invention is to provide a method and apparatus for training a convolutional neural network (CNN) by oneself by using a small dataset in an environment in which a large dataset cannot be secured.

The objects of the present invention are not restricted to the one set forth herein. The above and other aspects of the present invention will become more apparent to one of ordinary skill in the art to which the present invention pertains by referencing the detailed description of the present invention given below.

Technical Solution

According to an embodiment of the present invention, there is provided a machine learning method based on weakly supervised learning, the method performed by a machine learning apparatus and comprises extracting feature maps about a dataset given a first type of information and not given a second type of information by using a convolutional neural network (CNN), updating the CNN by back-propagating a first error value calculated as a result of performing a task corresponding to the first type of information by using a first model and updating the CNN by back-propagating a second error value calculated as a result of performing the task corresponding to the first type of information by using a second model different from the first model, wherein the second type of information is extracted when the task corresponding to the first type of information is performed using the second model.

According to another embodiment of the present invention, there is provided a machine learning method based on weakly supervised learning, the method performed by a machine learning apparatus and comprises extracting feature maps about a dataset given a first type of information and not given a second type of information by using a CNN, calculating a first error value by performing a task corresponding to the first type of information by using a first model and calculating a second error value by performing the task corresponding to the first type of information by using a second model different from the first model, calculating a third error value by applying a weight to each of the first error value and the second error value and updating the CNN by back-propagating the third error value, wherein the second type of information is extracted when the task corresponding to the first type of information is performed using the second model.

According to yet another embodiment of the present invention, there is provided a machine learning apparatus based on weakly supervised learning, the apparatus comprises one or more processors, a memory which loads a computer program executed by the processors; and a storage, wherein the computer program comprises a feature map extraction operation of extracting feature maps about a dataset given a first type of information and not given a second type of information by using a CNN, a first learning operation of updating the CNN by back-propagating a first error value calculated as a result of performing a task corresponding to the first type of information by using a first model and a second learning operation of updating the CNN by back-propagating a second error value calculated as a result of performing the task corresponding to the first type of information by using a second model different from the first model, wherein the second type of information is extracted when the task corresponding to the first type of information is performed using the second model in the second learning operation.

According to still another embodiment of the present invention, there is provided a computer program coupled to a computing device and stored in a recording medium to execute a machine learning method based on weakly supervised learning, the computer program comprises an operation of extracting feature maps about a dataset given a first type of information and not given a second type of information by using a CNN, an operation of updating the CNN by back-propagating a first error value calculated as a result of performing a task corresponding to the first type of information by using a first model; and an operation of updating the CNN by back-propagating a second error value calculated as a result of performing the task corresponding to the first type of information by using a second model different from the first model, wherein the second type of information is extracted when the task corresponding to the first type of information is performed using the second model.

Advantageous Effects

According to some embodiments of the present invention, a machine learning apparatus can perform a task in the computer vision field through self-machine learning without using a pre-trained network in a weakly supervised learning environment.

According to some embodiments of the present invention, the machine learning apparatus can train a CNN even when a small dataset is provided.

However, the effects of the present invention are not restricted to the one set forth herein. The above and other effects of the present invention will become more apparent to one of daily skill in the art to which the present invention pertains by referencing the claims.

DESCRIPTION OF DRAWINGS

FIG. 16 illustrates a performance evaluation table of an object localization apparatus based on an actual experimental example:

MODE FOR INVENTION

Figure 1:
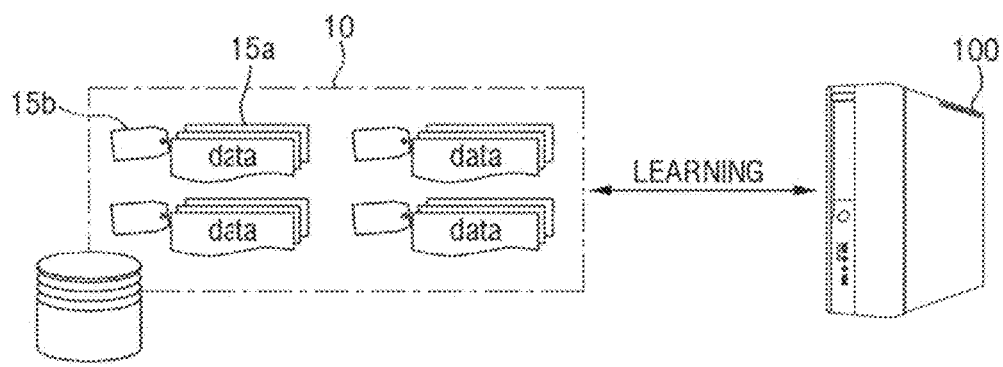
FIG. 1 illustrates the configuration of a machine learning system based on weakly supervised learning according to an embodiment.

The present invention concept will now be described more fully with reference to the accompanying drawings, in which exemplary embodiments of the present invention are shown. Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like components throughout the specification.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The terminology used herein is for the purpose of describing particular embodiments only and is not intended to be limiting of the present invention. As used herein, the singular forms "a", "an" and "the" are intended to include the plural forms as well, unless the context clearly indicates otherwise.

It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Hereinafter, the present invention will be described in greater detail with reference to the attached drawings.

FIG. 1 illustrates the configuration of a machine learning system based on weakly supervised learning according to an embodiment of the present invention.

The machine learning system based on weakly supervised learning may include a dataset 10 which is to be learned and a machine learning apparatus 100. The dataset 10 may include image and video data used for tasks in the field of computer vision. Each piece 15a of data that forms the dataset 10 may include a label 15b.

The label 15b indicates given information about each piece 15a of data, that is, information about an answer given in weakly supervised learning. The label 15b may also be referred to as a tag or an annotation by those of ordinary skill in the art.

Using information given through the label 15b, the machine learning apparatus 100 may train a convolutional neural network (CNN) in a random initial state by performing a task in the computer vision field.

When certain information is given, the machine learning apparatus 100 may perform a task corresponding to the given information and update the CNN by back-propagating an error value generated as a result of performing the task. As this process is repeated, the CNN is trained, and machine learning is performed.

An objective of machine learning is to update the CNN so that the CNN can extract better feature maps and enable the machine learning apparatus 100 to perform its intended task by itself using the fine-tuned CNN.

Tasks in the computer vision field include object classification, object localization, object segmentation, video classification, and pose estimation. However, the tasks in the computer vision field are not limited to these examples and may include all tasks that can be performed using image and video data.

When object class information is given to the machine learning apparatus 100, the machine learning apparatus 100 may train the CNN by performing an object classification task corresponding to the object class information. If the CNN is fully trained, the machine learning apparatus 100 may perform a task different from the object classification task using the trained CNN, so that information other than the given object class information can be extracted.

The task of extracting the information other than the given object class information can be understood as a task that the machine learning apparatus 100 ultimately intends to perform.

According to another embodiment of the present invention, the machine learning apparatus 100 may include a storage which stores the dataset 10.

Figure 2:
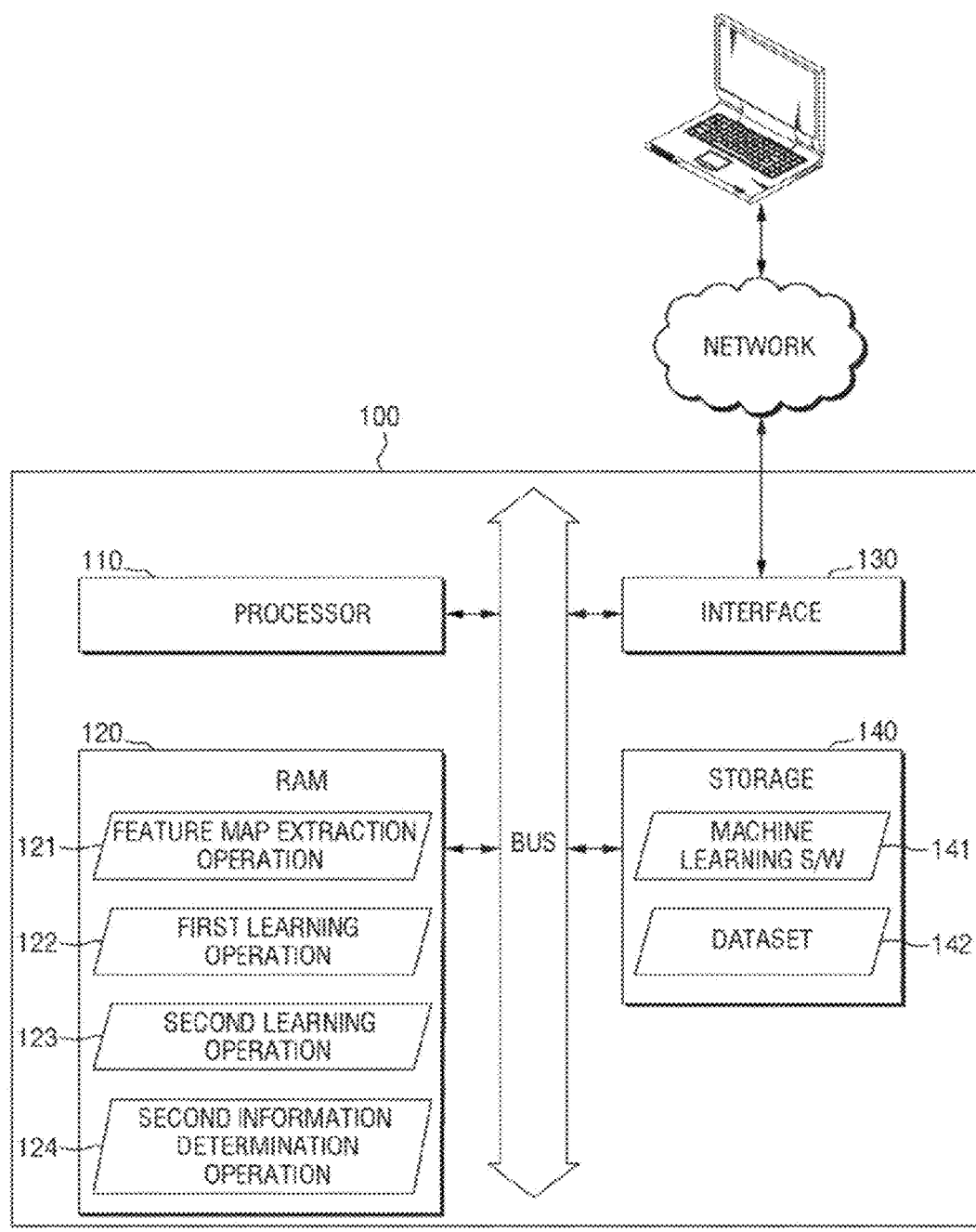
FIG. 2 illustrates the hardware configuration of a machine learning apparatus based on weakly supervised learning according to an embodiment.

FIG. 2 illustrates the hardware configuration of a machine learning apparatus 1(x) based on weakly supervised learning according to another embodiment of the present invention. The structure and operation of the machine learning apparatus 100 will now be described with reference to FIG. 2.

Referring to FIG. 2, the machine learning apparatus 100 based on weakly supervised learning may include one or more processors 110, a memory 120, a storage 140, and an interface 130. The processors 110, the memory 120, the storage 140, and the interface 130 may exchange data with each other through a system bus.

The processors 110 execute machine learning software 141 loaded to the memory 120, and the memory 120 loads the machine learning software 141 from the storage 140. The machine learning software 141 may include a feature map extraction operation 121, a first learning operation 122, a second learning operation, and a second information determination operation 124.

As the processors 110 execute the machine learning software 141, the feature map extraction operation 121 may extract feature maps about a dataset 142, which is to be learned, using a CNN. As filters of the CNN are updated, feature maps extracted may be changed.

The first learning operation 122 may perform a task corresponding to a first type of information using extracted feature maps and a first model. The first learning operation 122 may calculate a first error value by comparing an output generated as a result of performing the task corresponding to the first type of information with the first type of information and update the CNN by back-propagating the calculated first error value.

Like the first learning operation 122, the second learning operation 123 may perform the task corresponding to the first type of information. However, the second learning operation 123 may use a second model different from the first model. The second learning operation 123 may calculate a second error value by comparing an output generated as a result of performing the task corresponding to the first type of information with the first type of information and update the CNN by back-propagating the calculated second error value.

The second learning operation 123 may extract second type of information when performing the task corresponding to the first type of information. The second learning operation 123 may predict the second type of information in the process of performing the task corresponding to the first type of information. Through this prediction process, the second type of information may be extracted.

The second information determination operation 124 may determine the second type of information using the second type of information extracted as the second learning operation 123 is executed. That is, a final value of the second type of information may be determined.

The second model is different from the first model but may perform the same task (which corresponds to the first type of information) as the task performed by the first model. Accordingly, like the first model, the second model may generate an output corresponding to the first type of information. However, the second model may generate the output in a different process from the first model. The second model may extract the second type of information when generating the output corresponding to the first type of information.

The second information determination operation 124 may perform a task of determining the second type of information when the CNN is fully trained and thus when the second type of information with a low error value and high accuracy can be obtained using the second model. Since the machine learning apparatus 100 can produce the second type of information, which is ungiven information about a dataset, using the second information determination operation 124, it can perform an intended task even in a weakly supervised learning environment.

In this way, the machine learning apparatus 100 itself can train the CNN and determine the ungiven second type of information using the trained CNN. The task of determining the second type of information is a task intended by the machine learning apparatus 100.

Each component described above with reference to FIG. 3 may be implemented as a software component or a hardware component such as a field programmable gate array (FPGA) or application specific integrated circuit (ASIC). However, the components are not limited to the software or hardware components. A component may advantageously be configured to reside on the addressable storage medium and configured to execute on one or more processors. The functionality provided for in the components may be combined into fewer components or further separated into additional components.

Figure 3:
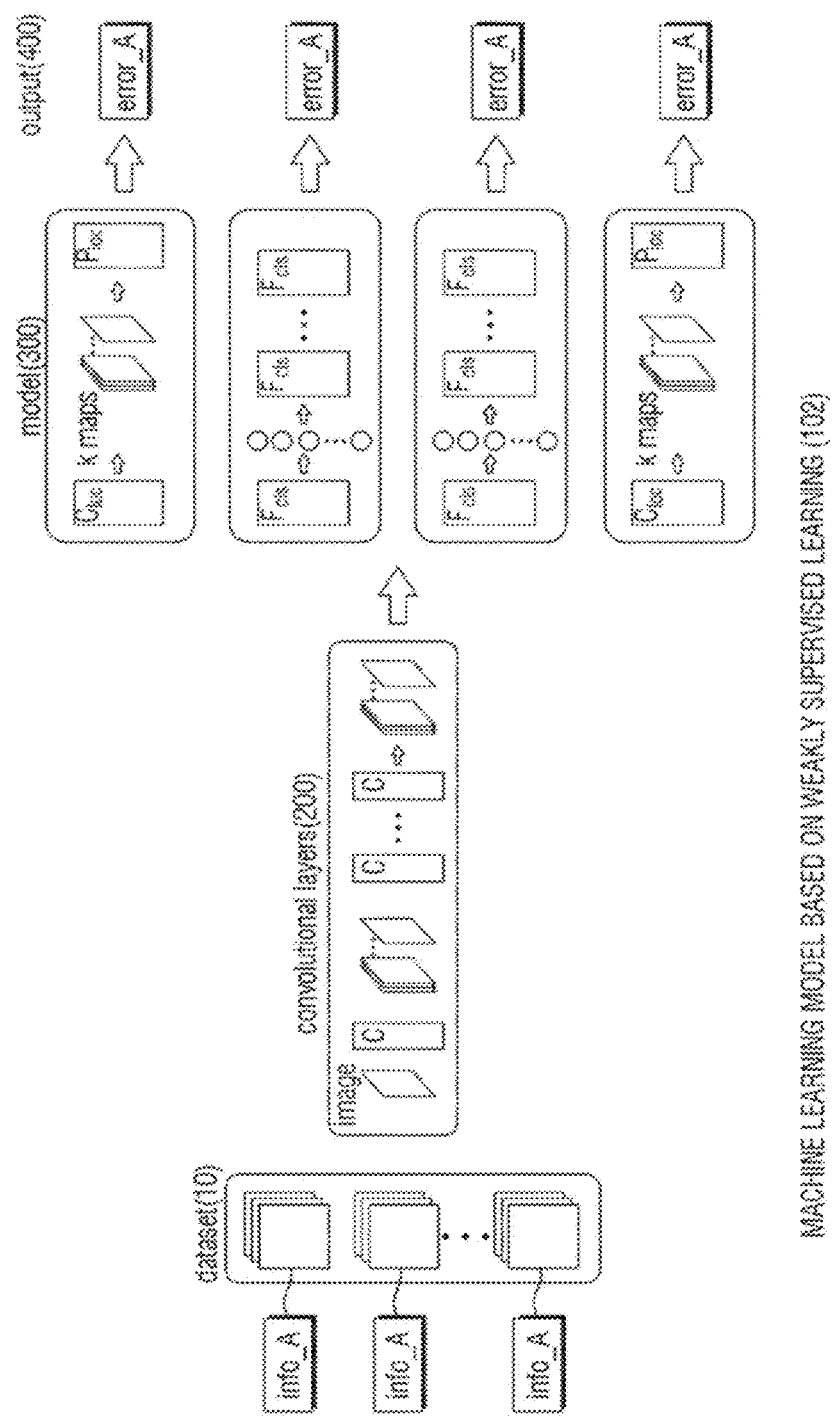
FIG. 3 illustrates a machine learning model based on weakly supervised learning, which is referred to in some embodiments.

FIG. 3 illustrates a machine learning model 102 based on weakly supervised learning, which is referred to in some embodiments of the present invention. The machine learning model 102 may be implemented as the machine learning apparatus 100.

The machine learning model 102 may consist of a dataset 10, convolutional layers 200, and a plurality of models 300 which perform specific tasks about the dataset 10.

The dataset 10 may consist of a plurality of pieces of data and may be labeled with information related to each piece of data. In FIG. 3, info_A is illustrated as an example. Info_A is information given as an answer about a dataset when the convolutional layers 200 are trained in the weakly supervised learning environment.

Each of the models 300 may receive feature maps generated by the convolutional layers 200, perform a task corresponding to info_A, and generate an output corresponding to info_A. Then, each of the models 300 may calculate an error value by comparing the output with the given info_A.

The convolutional layers 200 are a network to which a CNN has been applied. The convolutional layers 200 may extract feature maps about the given dataset 10. To extract good feature maps that can reflect features of data well, an optimum weight value and an optimum bias value of each filter should be determined.

Each of the models 300 may receive feature maps from the convolutional layers 200 and perform a task related to info_A. For example, if info_A is object class information, each of the models 300 may perform an object classification task. If info_A is object location information, each of the models 300 may perform an object localization task.

In a case where info_A is the object class information, each of the models 300 may serve as a classifier which performs the object classification task. The classifier may generate a probability (or a class probability) that each piece of data will belong to a class as an output corresponding to the object class information.

That is, the output corresponding to the object class information is a predicted classification result value generated by each model 300 for each piece of data that forms the dataset 10. If a predicted value for a piece of data is calculated, it may be compared with given answer info_A about the piece of data, and the difference between the predicted value and the given answer info_A may be calculated as an error value.

The calculated error value may be back-propagated to update the convolutional layers 200. Here, a weight or a bias value of each convolutional layer 200 is updated to reduce the error value. Through this process, the convolutional layers 200 learn the given dataset 10 and are trained to extract good feature maps about the dataset 10.

The machine learning model 102 may appear similar to a conventional multi-task learning model. However, they are different in aspects related to weakly supervised learning. The differences will now be described with reference to FIG. 4.

Figure 4:
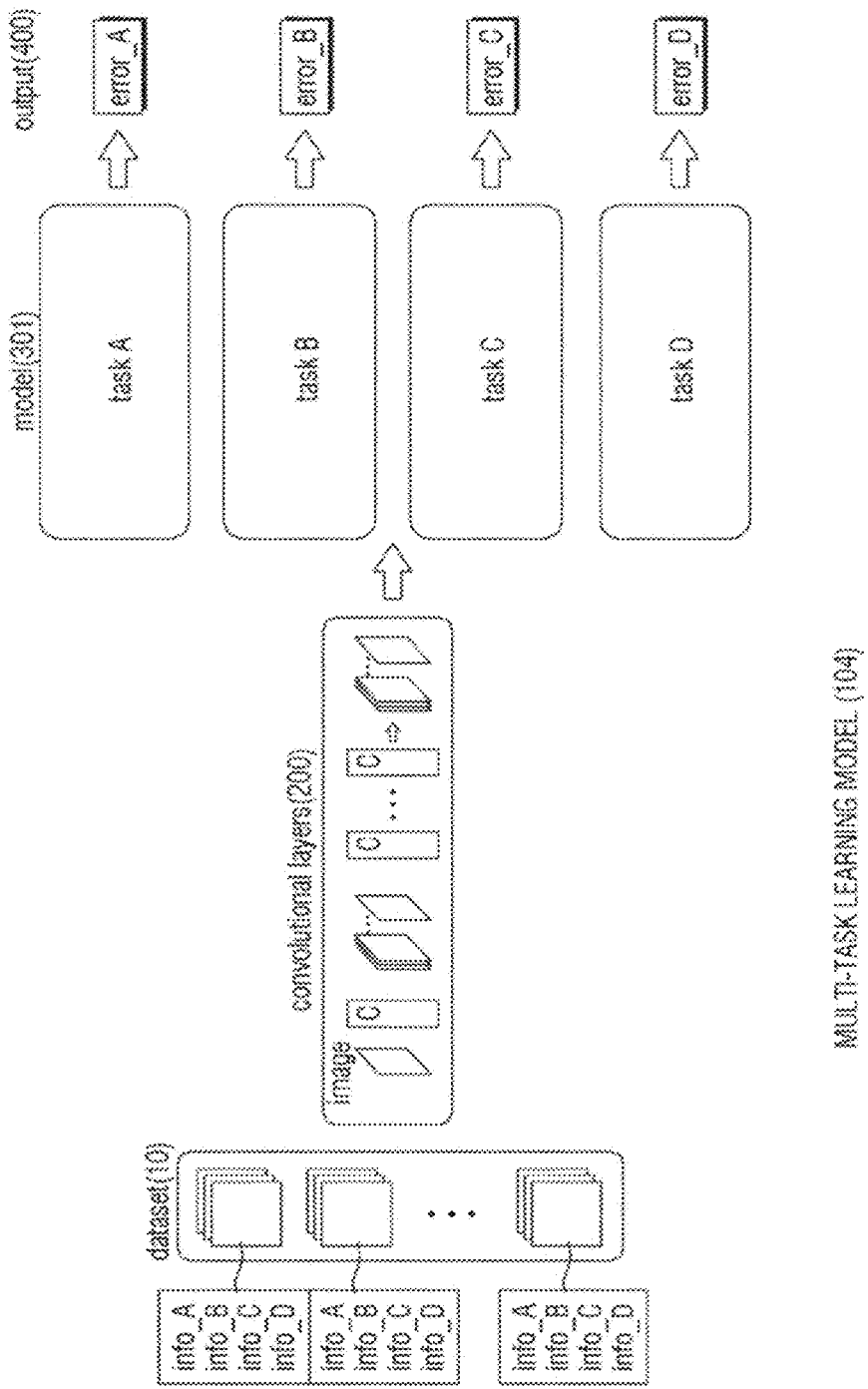
FIG. 4 illustrates a conventional multi-task learning model.

FIG. 4 illustrates a conventional multi-task learning model 104.

Multi-task learning is a paradigm of machine learning and a method of learning by simultaneously performing a plurality of connected tasks using a shared representation.

The multi-task learning model 104 used in the computer vision field consists of a dataset 10 which is to be learned, convolutional layers 200, and a plurality of models 301.

The convolutional layers 200 correspond to a shared representation, and the models 300 perform different tasks using different types of information.

Generally, each of the models 301 in the multi-task learning model 104 performs a different task corresponding to a different piece of information by using the different piece of information. The convolutional layers 200 are trained by back-propagating an error value calculated as a result of performing a task corresponding to each piece of information.

The models 301 may be designed to solve a target problem by cooperating with each other. The models 301 may also be designed in such a way that a result value generated by each of the models 301 can help the task execution of other models 301.

The multi-task learning model 104 of FIG. 4 is designed to have four different models 301. The dataset 10 has four pieces of information used by each of the model 301s.

The four models 301 may perform different tasks task A through task D using different pieces of information info_A through info_D labeled to the dataset 10 which is to be learned. Task A may produce a value of error_A as an output 400 corresponding to info_A, task B may produce a value of error_B as an output 400 corresponding to info_B, task C may produce a value of error_C as an output 400 corresponding to info_C, and task D may produce a value of error_D as an output corresponding to info_D.

Each of the result values error_A through error_D may be used to train the convolutional layers 200, and the result of training the convolutional layers 200 using each output 400 may help the task execution of other models 301.

The multi-task learning model 104 is based on a supervised learning method. The supervised learning method is a learning method performed with a given answer. Therefore, since a right output for an input should be available, answers about the dataset 10 should be provided together with the dataset 10 which is an input.

For example, in the case of object classification in which an object is classified as an apple, a pear or a banana, each piece of image data should be labeled with object class information, that is, an answer indicating that a corresponding image is an apple, a pear or a banana. A task corresponding to the object class information is an object classification task.

Therefore, an object classifier is designed as one model. The object classifier performs a classification task using feature maps extracted by a CNN and calculates an error value by comparing a given answer with a predicted class. The error value is back-propagated and used to update the CNN.

In addition, in the case of object localization in which the location of an object (e.g., an apple, a pear or a banana) in each image is detected, each piece of image data may be labeled with a coordinate box indicating where in the corresponding piece of image data an object is located.

A task corresponding to this object location information is an object localization task. Therefore, an object localizer may be designed as another model. The object localizer may perform a localization task using feature maps extracted by a CNN and calculate an error value by comparing a given answer and the predicted location of an object. The error value is back-propagated and used to update the CNN.

As described above, the multi-task learning model 104 based on supervised learning should be provided with answers about a dataset, and each model of the multi-task learning model 104 should calculate an error value corresponding to a different piece of information by performing a different task.

In weakly supervised learning, however, answer information that is given is limited. Therefore, each model cannot be designed to perform a different task, and the type of an output is limited to an output corresponding to given information. For this reason, the conventional multi-task learning method cannot be used in the weakly supervised learning environment.

On the other hand, a machine learning model according to an embodiment of the present invention, although it uses a plurality of models, has a completely different structure from the conventional multi-task learning model 104. Machine learning technology is evolving from supervised learning to weakly supervised learning and ultimately to unsupervised learning.

Therefore, the machine learning model of the of the present invention is designed to extract values related to ungiven information by using limited information. Consequently, the machine learning model of the present invention can perform an intended task even in an environment of limited information, which is an objective of the present invention.

The intended task may refer to a task of determining information other than given information about data to be learned. A machine learning apparatus may be designed to train a CNN using given information and determine information other than the given information using the CNN fine-tuned through training. The intended task will hereinafter be referred to as a target task.

Figure 5:
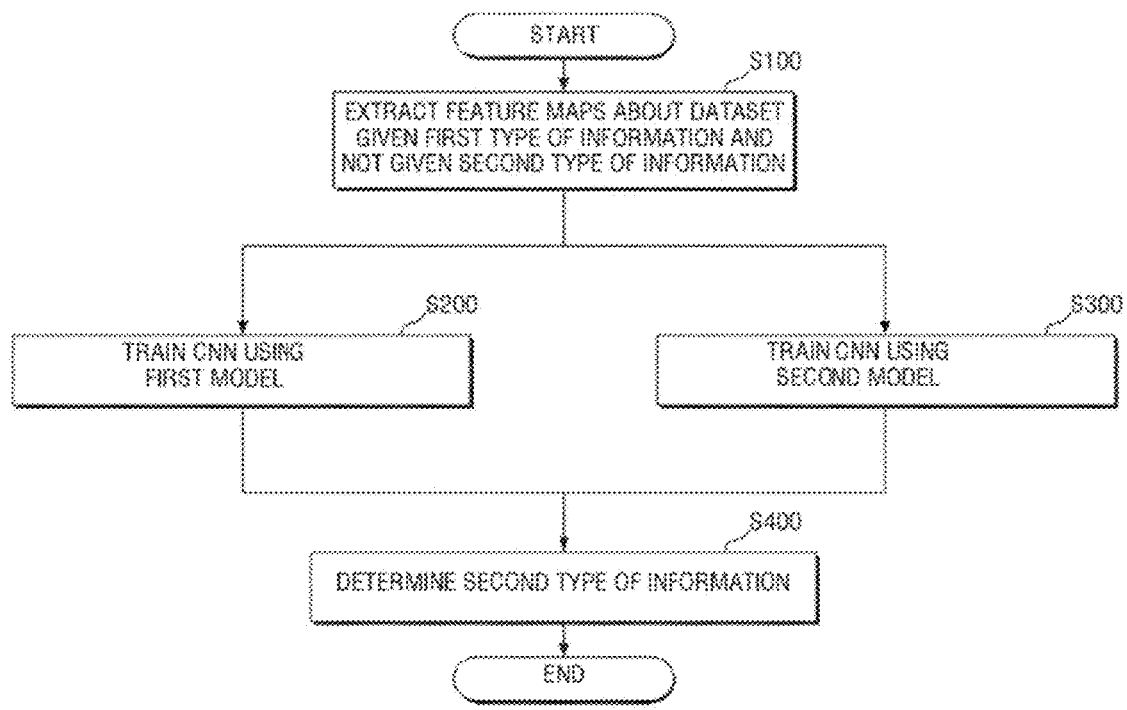
FIG. 5 is a flowchart illustrating a machine learning method based on weakly supervised learning according to an embodiment.

FIG. 5 is a flowchart illustrating a machine learning method based on weakly supervised learning according to yet another embodiment of the present invention.

Referring to FIG. 5, the machine learning apparatus 100 may extract feature maps about a dataset given a first type of information but not given a second type of information (operation S100). To learn the dataset, the machine learning apparatus 100 may train a CNN using a first model (operation S200) and train the CNN using a second model (operation S300). Once the CNN is fully trained, the machine learning apparatus 100 may determine the second type of information (operation S400). Operation S400 is a target task.

In operation S100, the first type of information is answer information about the dataset. The second type of information is information that is to be obtained through the execution of the target task (operation S400) and ungiven information about the dataset.

In operations S200 and S300, the machine learning apparatus 100 may perform a task corresponding to the first type of information using the first model and the second model and generate an output corresponding to the first type of information. The output may be a probability value related to the first type of information of data included in the dataset.

For example, if the first type of information is class information, the output may be a value of probability that specific data will belong to a specific class. If the first type of information is object location information, the output may be a value of probability that an object will be located at a specific location in the data.

Once the output is generated in this way, each of the first model and the second model may calculate an error value by comparing the generated output and the given first type of information. Then, the machine learning apparatus 100 may train the CNN by back-propagating the error value.

This process eliminates the inconvenience experienced when a conventional CNN-based machine learning apparatus and model based on weakly supervised learning fine-tunes a CNN using a pre-trained network.

In addition, since the machine learning apparatus 100 learns an input dataset by itself a CNN optimized for the input dataset can be obtained. A pre-trained network used in conventional transfer learning is trained on a large number of general images.

Therefore, it is difficult to use the pre-trained network for tasks performed on special images which have different features from general images. However, this problem is solved by the machine learning apparatus 100

The training of the CNN using the first model (operation S200) and the training of the CNN using the second model (operation S300) may be performed simultaneously or sequentially in this order. This will now be described with reference to FIGS. 6 and 7.

Figure 6:
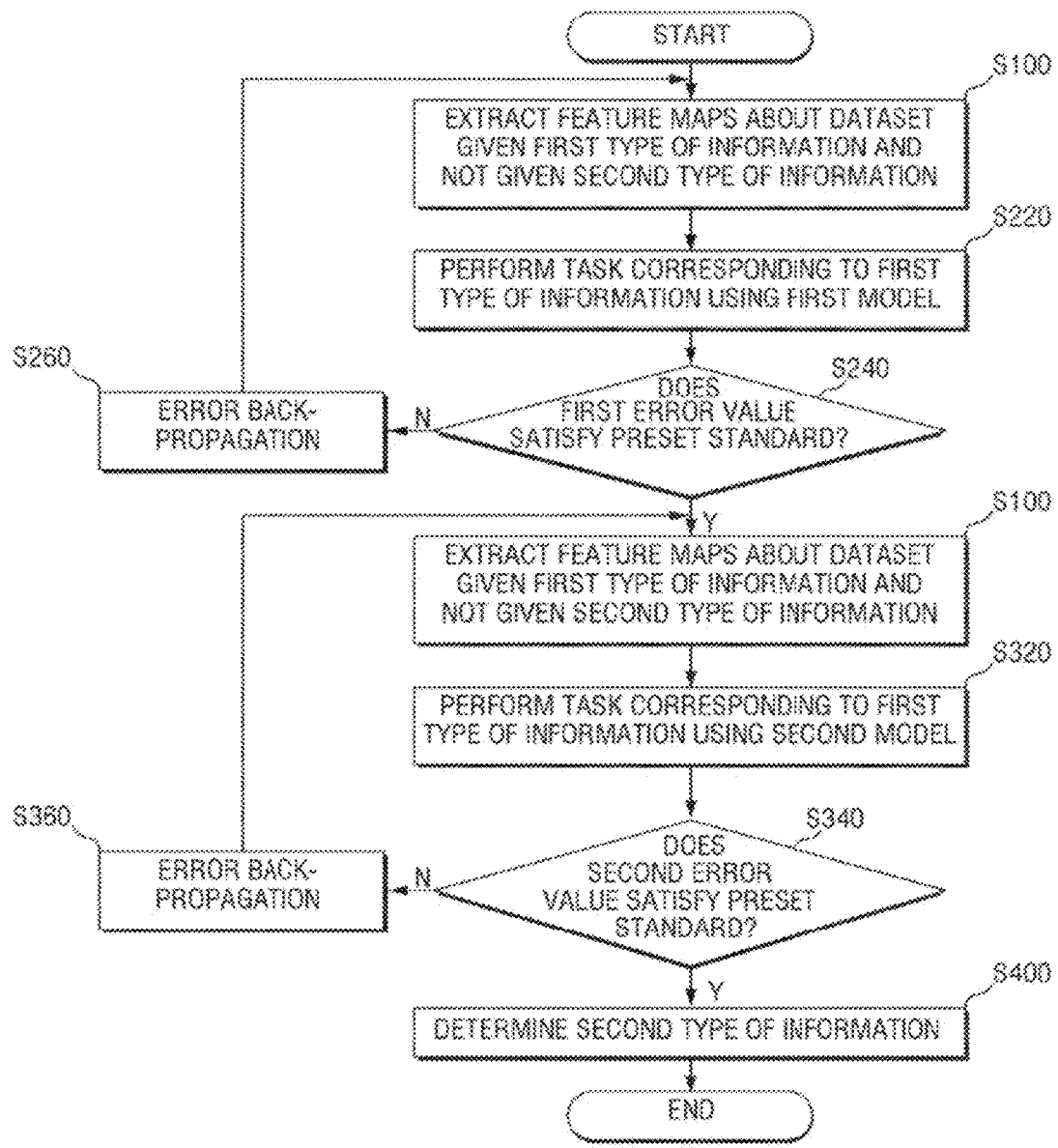
FIG. 6 is a flowchart illustrating a machine learning method based on weakly supervised learning, in which training by a first model and training by a second model are performed sequentially according to an embodiment.

FIG. 6 is a flowchart illustrating a machine learning method based on weakly supervised learning, in which training by a first model and training by a second model are performed sequentially according to yet another embodiment of the present invention.

The machine learning apparatus 100 may extract feature maps about a dataset given a first type of information and not given a second type of information by using a CNN (operation S100). The machine learning apparatus 100 may perform a task corresponding to the first type of information using a first model (operation S220) and determine whether a first error value calculated as a result of performing the task satisfies a preset standard (operation S240).

In operation S240, whether the first error value satisfies the preset standard is determined to determine whether the CNN has been fully trained. A smaller error value indicates that the CNN has been trained better. Therefore, the preset standard may be a sufficiently small value.

If the first error value does not satisfy the preset standard, it may be back-propagated (operation S260) and used to update the CNN. That is, the CNN should be trained continuously because it has not been fully trained.

On the other hand, if the first error value satisfies the preset standard, the machine learning apparatus 100 may determine that the CNN has been fully trained and perform a task using the second model (operations S320, S340, and S360).

Here, the task performed using the second model is carried out after the CNN is trained using the first model in order to increase the overall learning speed and increase the accuracy of a target task.

The target task of the machine learning apparatus 100 is to extract and determine the second type of information. If an output intended by the target task is to be extracted by the second model, the task performed by the second model should be carried out using a fully trained CNN. This is because a fully trained CNN can generate better feature maps, and the second type of information generated in the process of performing the task using the second model has higher accuracy when better feature maps are used as an input of the second model.

The second model may extract the second type of information different from the first type of information. This is because the first model and the second model are different models that perform even the same task in different processes. For example, if the first model and the second model are designed to have different network layer structures, they may generate even the same output through different processes.

Due to the different processes of the first model and the second model, the second model may produce different information from the first type of information. The information may be different from the given information and may be target information intended to be extracted through the target task. Thus, the second model may be designed to generate the target information through the target task.

The machine learning apparatus 100 may fully train the CNN using the first model and determine the second type of information, which ultimately makes the target task meaningful, using the second model.

The training by the first model and the training by the second model can also be performed simultaneously as will now be described with reference to FIG. 7.

Figure 7:
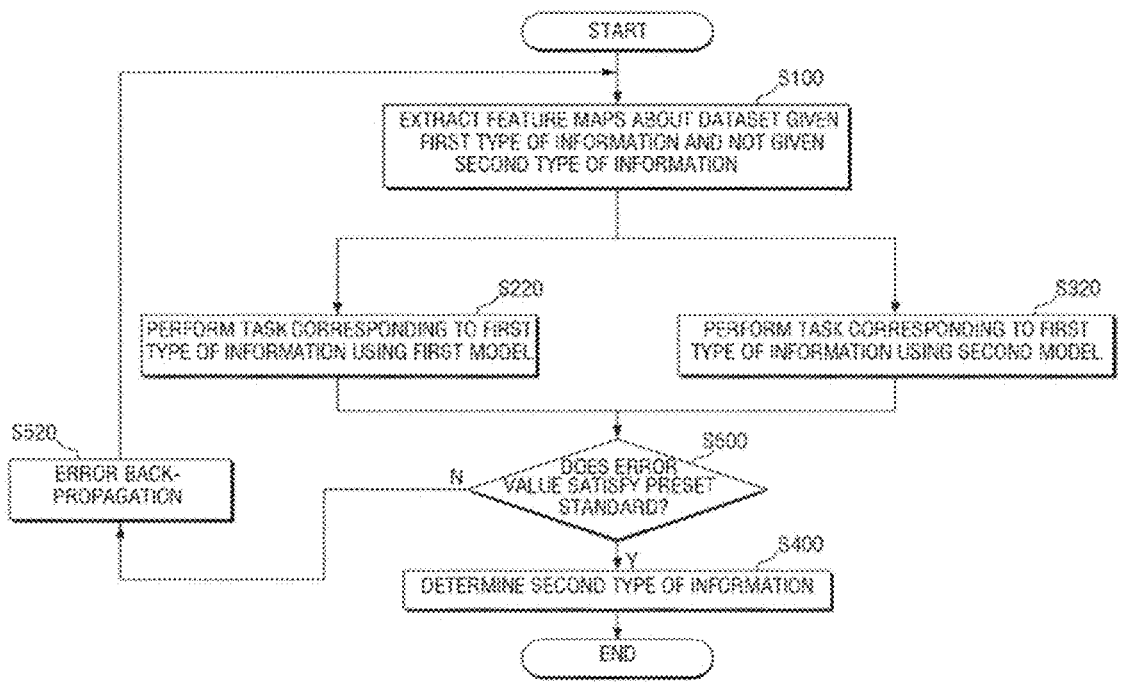
FIG. 7 is a flowchart illustrating a machine learning method based on weakly supervised learning, in which training by a first model and training by a second model are performed simultaneously according to an embodiment.

FIG. 7 is a flowchart illustrating a machine learning method based on weakly supervised learning, in which training by a first model and training by a second model are performed simultaneously according to yet another embodiment of the present invention.

The machine learning apparatus 100 may extract feature maps about a dataset given a first type of information and not given a second type of information by using a CNN (operation S100). The machine learning apparatus 100 may input the extracted feature maps to a first model and a second model and perform a task corresponding to the first type of information using the first model (operation S220) and at the same time perform the task corresponding to the first type of information using the second model (operation S320).

In operations S220 and S320, the machine learning apparatus 100 may calculate an error value corresponding to the first type of information. The machine learning apparatus 100 may determine whether the calculated error value satisfies a preset standard (operation S500). In operation S500, the machine learning apparatus 100 may determine whether the CNN has been trained enough for a target task to be performed.

Assuming that an error value generated by the first model is a first error value and that an error value generated by the second model is a second error value, the preset standard may be designated as a particular first error value or as a particular second error value. Alternatively, the preset standard may be designated as a combination of the first error value and the second error value.

If the calculated error value satisfies the preset standard, the machine learning apparatus 100 may determine the second type of information (operation S400). That is, the machine learning apparatus 100 may perform a target task by determining the second type of information to be used for corresponding data.

On the other hand, if the calculated error value does not satisfy the preset standard, the machine learning apparatus 100 may train the CNN by back-propagating the error value (operation S520).

The machine learning apparatus 100 may train the CNN by simultaneously using the first error value calculated by the first model and the second error value calculated by the second model. In addition, the machine learning apparatus 100 may reflect the relative importance of each of the first model and the second model in each stage of training.

For example, a third error value may be calculated by giving a weight to each of the first error value and the second error value. At the initial stage of training, the machine learning apparatus 100 may give a greater weight to the first error value so as to reinforce learning through the first model. As the training proceeds, the machine learning apparatus 100 may give a greater weight to the second error value.

Until now, the machine learning apparatus 100 has been described. As an example of the machine learning apparatus 100, an object localization apparatus will hereinafter be described with reference to FIGS. 8 through 14.

If information given to the machine learning apparatus 100 is object class information, if the first model is an object classifier, if the second model is an object localizer and if a target task is an object localization task, the machine learning apparatus 100 may be referred to as an object localization apparatus or an object localization model.

Figure 8:
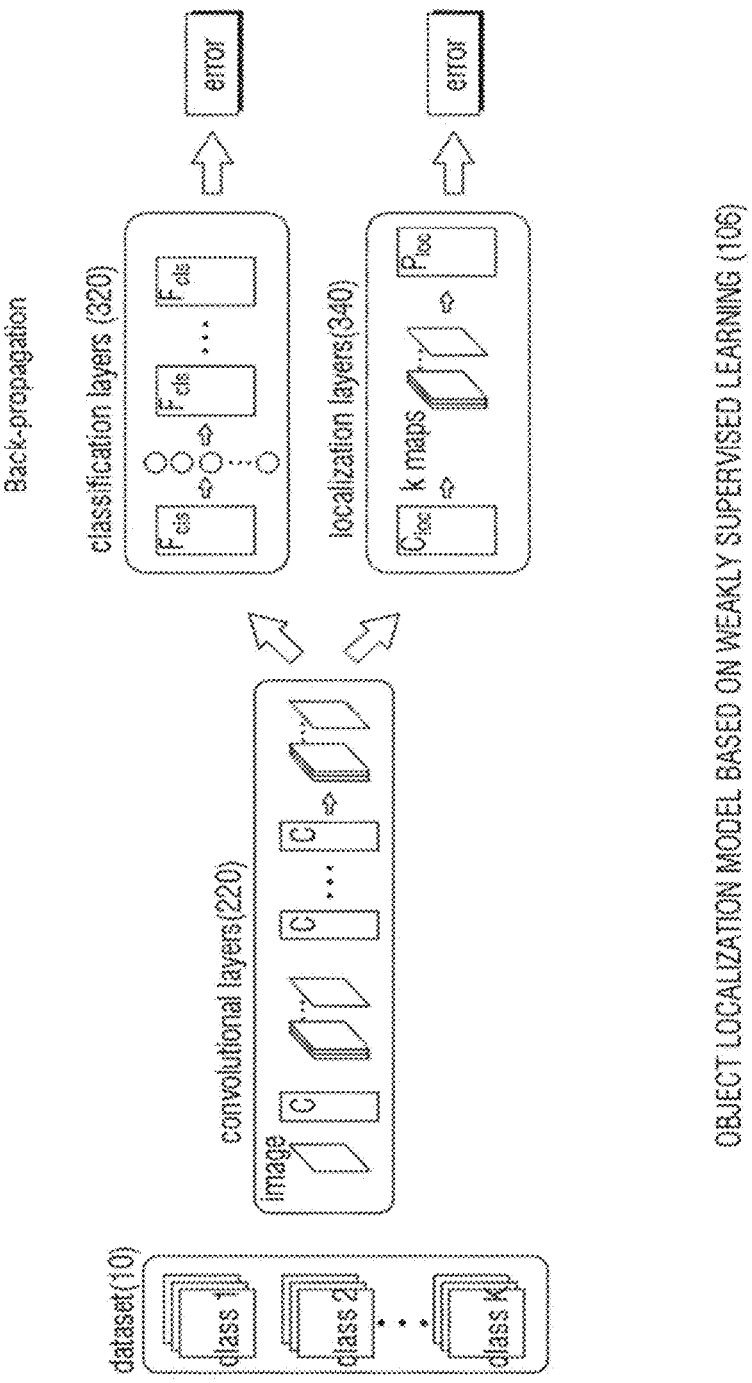
FIG. 8 illustrates an object localization model based on weakly supervised learning, which is referred to in some embodiments.

FIG. 8 illustrates an object localization model 106 based on weakly supervised learning, which is referred to in some embodiments of the present invention.

The object localization model 106 may include a dataset 10, convolutional layers 220, classification layers 320, and localization layers 340. The convolutional layers 220 are network layers to which a CNN has been applied, the classification layers 320 are network layers which perform object classification, and the localization layers 340 are network layers which perform object localization.

A target task of the object localization model 106 is an object localization task. Since only class information is given to the object localization model 106, the classification layers 320 and the localization layers 340 should perform object classification. Once object classification is performed, a class probability value is calculated. The classification layers 320 may generate an error value by comparing the calculated probability value with the given class information. Then, the classification layers 320 may train the convolutional layers 220 by back-propagating the generated error value.

A task of the classification layers 320 and a task of the localization layers 340 may be performed simultaneously. Alternatively, after the task of the classification layers 320 is performed fully, the task of the localization layers 340 may be performed. A case where the task of the localization layers 340 is performed after the task of the classification layers 320 is performed will be described with reference to FIGS. 8, 10 and 11.

The task of the classification layers 320 is performed first to train the shared convolutional layers 220 by performing the object classification task corresponding to the given class information. The training may refer to a task of adjusting a weight and a bias of each of the convolutional layers 220 so that the convolutional layers 220 can extract good feature maps about the given dataset 10.

Through the above process, the convolutional layers 220 in an arbitrary initial state can be trained and fine-tuned without a pre-trained network. The arbitrary initial state of the convolutional layers 220 may refer to a state in which, e.g., a weight of each filter has not been set to a particular value. The weight value of each filter of the initial convolutional layers 220 may be initialized to an arbitrary value. For example, the weight value may be randomly extracted from a particular probability distribution.

To train the CNN, the object localization model 106 may additionally have the classification layers 320. The object localization model 106 is different from a conventional object localization model based on weakly supervised learning in that it has an object classifier. The structure of the conventional object localization model will be described later with reference to FIG. 9.

Once the convolutional layers 220 are trained fully, the localization layers 340 may perform the object classification task. The localization layers 340 may receive feature maps extracted by the fully trained convolutional layers 220.

When receiving the feature maps, the localization layers 340 may extract a number of score maps equal to the number of classes, wherein the score maps store object location information. If the number of classes is k, k score maps may be extracted. Generally, k feature maps finally extracted by an object localizer are referred to as score maps. The object localization model 106 may extract the object location information from the score maps.

The localization layers 340 may perform the object classification task by mapping each of the extracted k score maps to a single value. For example, the localization layers 340 may generate a k-dimensional vector by mapping a score map extracted for each class to a single value. Accordingly, a probability that specific data will belong to each class may be calculated.

When a class prediction value for data is generated, the localization layers 340 may compare the class prediction value with the labeled class information and calculate a difference between them as an error value. Then, the localization layers 340 may train the convolutional layers 220 by back-propagating the calculated error value. When the convolutional layers 220 are fully trained, the localization layers 340 may determine the location of an object.

In the object localization model 106, the convolutional layers 220 are trained directly using a target dataset of a target task. Therefore, the target task can be learned fast and have high accuracy. Compared with the conventional object localization model based on weakly supervised learning, the object localization model 106 has improved performance as validated through experiments. Experimental data will be described later with reference to FIGS. 16 through 20.

Figure 9:
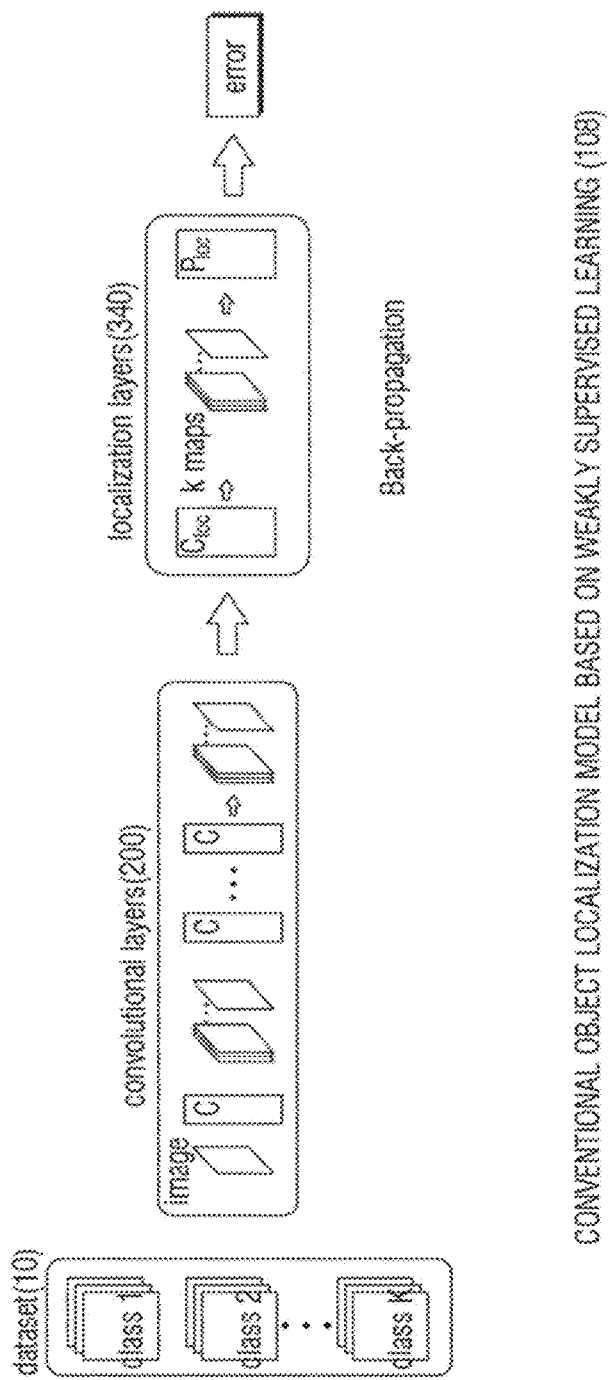
FIG. 9 illustrates a conventional object localization model based on weakly supervised learning.

A conventional object localization model used in the weakly supervised learning environment will now be described with reference to FIG. 9. FIG. 9 illustrates a conventional object localization model 108 based on weakly supervised learning.

The conventional object localization model 108 may include a dataset labeled with class information, convolutional layers 200, and localization layers 340. As in the example of FIG. 8, given information is the class information, and a target task is an object localization task.

The conventional object localization model 108 may include the localization layers 340 for performing the target task and the convolutional layers 200 fine-tuned using a pre-trained network.

The pre-trained network is used because object class information about data is given but object location information is not given in a weakly supervised learning environment. Since the object location information is not given, it is difficult for the conventional object localization model 108 to perform learning for the object localization task by itself. Therefore, a network pre-trained using another dataset is applied to the convolutional layers 200 and used after modifications.

The localization layers 340 perform the object classification task corresponding to the given class information by using the fine-tuned convolutional layers 200. The localization layers 340 calculate an error value by comparing an output generated as a result of performing the object classification task with the given class information. The error value may be back-propagated to update the convolutional layers 200.

The conventional object localization model 108 can reduce the error value and increase accuracy by training the convolutional layers 200 through the above process. The conventional object localization model 108 can determine object location information when the object classification task of the conventional object localization model 108 has more than a certain level of accuracy.

Therefore, although the target task can also be performed by the conventional object localization model 108, there is a clear difference in learning speed. As validated through experimental results, the conventional object localization model 108 is slower in reducing the error value and in increasing accuracy than the object localization model 106 according to the embodiment of the present invention.

This is because an initial CNN used by the localization layers 340 of the conventional object localization model 108 is not trained using a dataset on which object localization is to be performed, but is a network pre-trained using another dataset.

If object location information is given together with a dataset, the conventional object localization model 108 itself may train the convolutional layers 200 using the information. However, since given information is limited in the weakly supervised learning environment, the conventional object localization model 108 cannot be learned by a task of extracting ungiven information.

Therefore, a transfer learning method using a network pre-trained through another large dataset has been utilized. The another large dataset may include a large number of general images that are given answers, such as ImageNet (high-resolution images given approximately 1.2 million answers belonging to about 1,000 categories) and LabelME (hundreds to thousands of completely split images).

The conventional object localization model 108 uses a convolutional network pre-trained using a large dataset as an initial value of a fixed feature extractor or convolutional network for a target task. This process is expressed as a process of fine-tuning a convolutional network.

However, there are fields in which it is difficult to use a network pre-trained using such general images. If an image or video to be analyzed has very different features from a general image, the pre-trained network cannot be used. This is because a region of interest in a general image can be completely different from a region of interest in a special image.

In this case, a large dataset given answers may be created for a special image, and learning may be performed using the dataset. However, there are fields in which such a large dataset cannot be obtained. As mentioned earlier, it is very exhausting to label each piece of data with answer information. In addition, certain data can cause the problem of personal privacy.

For example, in the medical field, a task of diagnosing a cancer and finding the location of a lesion that caused the cancer may be performed based on an X-ray image. Since the X-ray image has very different features from a general image, a network pre-trained using a general image set cannot be used. Even if the pre-trained network is used, learning efficiency and accuracy may be reduced significantly.

If the pre-trained network cannot be used, a large dataset given answers may be needed for the X-ray image. That is, the X-ray image should be labeled with information about the presence or absence of a cancer and the location of the cancer. However, such a labeling task should be performed on thousands or tens of thousands of X-ray images by professional medical workers. Therefore, too much time and money are spent on the labeling task.

Furthermore, there are many types of diseases that can be diagnosed using image or video data. In addition, there are various types of information that should be labeled for each disease. Therefore, it is almost impossible to create a dataset for each disease.

Another problem is personal privacy. If medical diagnosis results of individuals are created as a large dataset and used in a number of models, disease information of each individual can be leaked, which may entail compensation for numerous individuals. An embodiment related to the medical field will be described in detail later with reference to FIG. 15.

The machine learning apparatus 100 according to the present invention trains a CNN by performing a task corresponding to given information and then performs another task, thereby training the CNN and performing the intended task.

Therefore, the machine learning apparatus 100 can perform a task using a CNN optimized and trained for a given dataset without the need to use a pre-trained network. In addition, there is no need to consume human and financial resources to create a large dataset.

Figure 10:
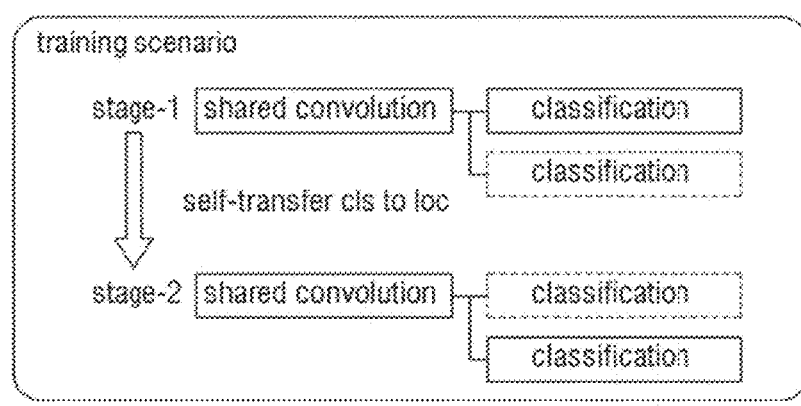
FIG. 10 illustrates a training scenario for a convolutional neural network (CNN), which is referred to in some embodiments.

A training scenario will now be described with reference to FIG. 10. FIG. 10 illustrates a training scenario for a CNN, which is referred to in some embodiments of the present invention.

At stage 1, a CNN is trained while a classification task is performed. At stage 2, the CNN fully trained through the classification task is used as an initial CNN in a localization task in the same way as in transfer learning. This is like self-transfer learning performed using the same CNN.

In summary, the machine learning apparatus 100 according to the embodiment, unlike the conventional art, does not require a pre-trained network and a large dataset. As long as at least one type of information about data is given, the machine learning apparatus 100 can perform another task at high learning speed and with high accuracy based on the given information.

Figure 11:
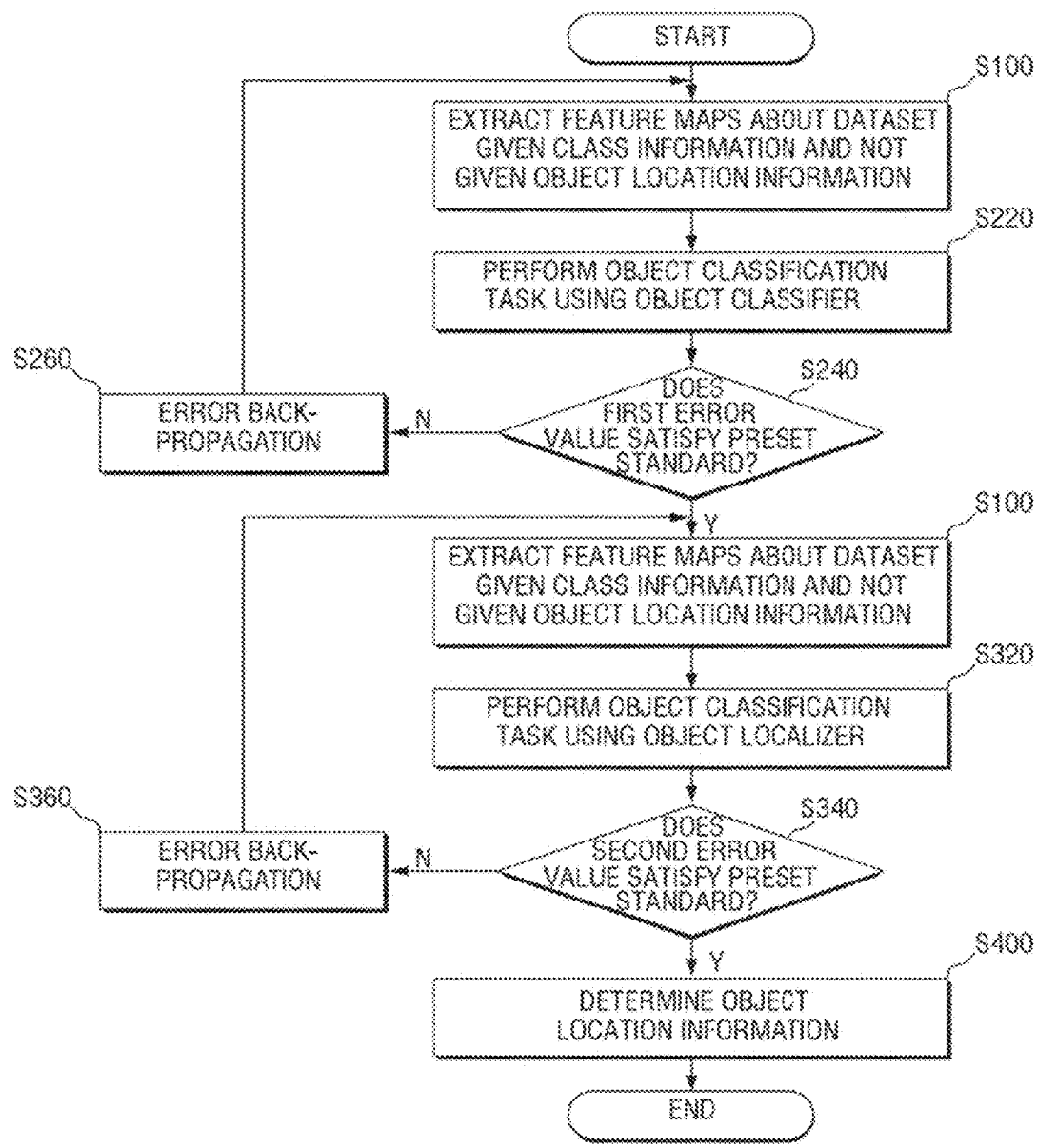
FIG. 11 is a flowchart illustrating an object localization method based on weakly supervised learning, in which training by an object classifier and training by an object localizer are performed sequentially according to an embodiment.

FIG. 11 is a flowchart illustrating an object localization method based on weakly supervised learning according to yet another embodiment of the present invention.

The object localization apparatus 106 may extract feature maps about a dataset given class information and not given object location information by using a CNN (operation S100). The dataset may be labeled with the class information.

The object localization apparatus 106 may perform an object classification task using an object classifier (operation S220). If the object classifier performs the object classification task, an output corresponding to the class information may be generated. The output may be a value of probability that an object will belong to each class. The object classifier may calculate an error value by comparing the output and the given class information.

The object localization apparatus 106 may determine whether the error value satisfies a preset standard (operation S240). If the error value does not satisfy the preset standard, the object localization apparatus 106 may update the CNN by back-propagating the error value (operation S260).

As described above, the CNN is trained in a way that reduces the error value. In operation S240, the object localization apparatus 106 may determine whether the CNN has been trained to more than a certain level. If the calculated error value satisfies the preset standard, that is, is equal to or smaller than a preset value, the object localization apparatus 106 may determine that the CNN has been trained fully through classification layers. In this case, the object localization apparatus 106 may start the object classification task using an object localizer.

If the object classification task of the object localizer is started, the object localization apparatus 106 may extract feature maps about the data given the class information and not given the object location information by using the CNN (operation S100).

The object localization apparatus 106 may perform the object classification task using the object localizer (operation S320). If the object localization apparatus 106 performs the object classification task, an output corresponding to the class information may be generated. The output may be a value of probability that an object will belong to each class. The output may be compared with the given class information to calculate an error value.

Once the error value is calculated, the object localization apparatus 106 may determine whether the error value satisfies a preset standard (operation S340). If the error value satisfies the preset standard, it may indicate that there is a small difference between an actual extracted value and the given information and that satisfactory accuracy has been obtained. If the error value does not satisfy the preset standard, the object localization apparatus 106 may update the CNN by back-propagating the error value (operation S360).

Therefore, the object localization apparatus 106 may perform a target task of determining the object location information (operation S400). The object localizer may generate a number of feature maps equal to the number of classes. Each feature map may include the object location information for each class. Feature maps finally extracted for each class may be referred to as score maps. If data is classified as class x, the object localization apparatus 106 may obtain a score map of class x and extract the object location information. If the object location information can be extracted with relatively high accuracy, the object localization apparatus 106 may determine a final value of second type of information using the extracted second type of information.

Although the object localizer performs the object classification task, it is a different model from the object classification model. For example, they may be different in the structure of network layers. An example of the network structure will be described later with reference to FIG. 12.

If the error value does not satisfy the preset standard (operation S340), the object localization apparatus 106 may train the CNN by back-propagating the error value calculated by the object localizer.

In operations S220 and S320, the output may be a value of probability that an object will belong to each class. For example, assuming that there are k classes and that a softmax function is used, the output may be calculated as a value of probability that specific data will belong to each of the k classes. The probability values, when added together, make 'l.' Therefore, the effect of normalization can be obtained by the use of the softmax function. Generally, the softmax function is used as a classification function in a highest layer of a neural network. As an alternative, a sigmoid function can be used.

In operations S260 and S270, the object localization apparatus 106 trains the CNN by back-propagating errors generated by the object classifier and the object localizer. Here, each error may have a different effect on the CNN. In particular, since the object classifier and the object localizer have different structures, the errors may be propagated to have different effects. This will now be described with reference to FIG. 12.

Figure 12:
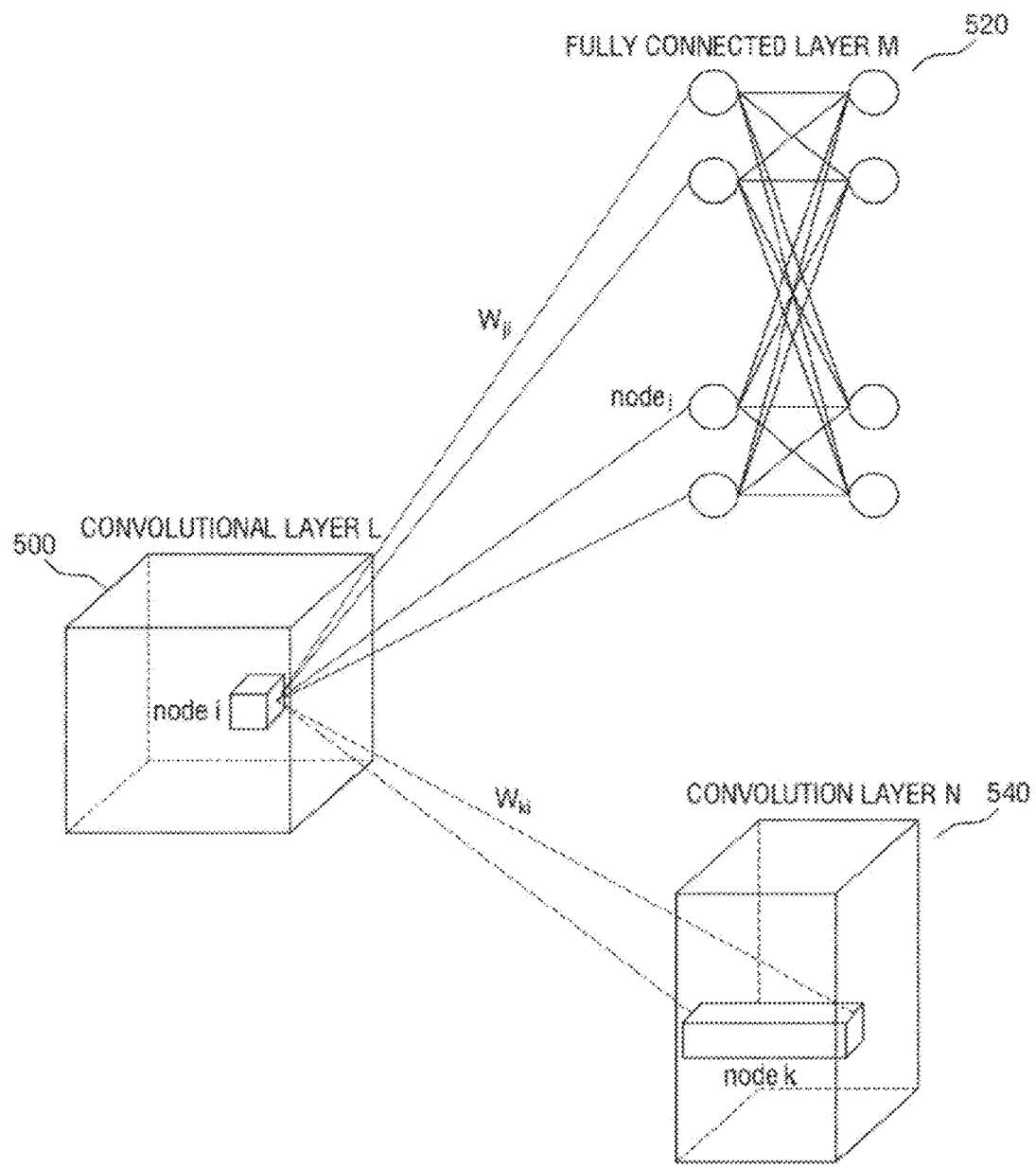
FIG. 12 illustrates an error back-propagation process which is referred to in some embodiments.

FIG. 12 illustrates an error back-propagation process which is referred to in some embodiments of the present invention.

The object localization model 106 may include convolutional layer L 500 which forms a CNN, classification layer M 520 which forms an object classifier, and convolutional layer N 540 which forms an object localizer.

Classification layer M 520 may be a fully connected layer, and convolutional layer N 540 may be composed of a number of score maps equal to the number of classes.

Classification layer M 520 may be densely connected to all nodes of convolutional layer L 500. Therefore, if an error is propagated through classification layer M 520, it may be evenly propagated to all locations in convolutional layer L 500.

However, this is not the case for convolutional layer N 540. Convolutional layer N 540 may map each score map to a single value in order to perform final classification. A method used in this process is global pooling.

Pooling is a sub-sampling process performed in a CNN. Pooling is used to reduce the size of a feature map and extract robust features from data. Global pooling is a method of mapping a feature map to a single value by selecting only one location in the entire area of the feature map or calculating the average of all locations.

Global pooling may be divided into global max pooling and global average pooling. Global max pooling is to select a maximum value from the entire feature map, and global average pooling is to select an average value of the entire feature map. Convolutional layer N 540 illustrated in FIG. 12 uses global max pooling.

Convolutional layer N 540 of FIG. 12 selects the location of node k through global max pooling. In this case, an error value calculated by the object localizer is propagated through the location of node k. Since the location of node k is connected to node i of convolutional layer L 500, the error value may be propagated only to node i.

Therefore, if a CNN is trained by the object localizer, an error is propagated only to a sub-sample which is a part of a feature map. Accordingly, only a part of the entire area of an image can be learned.

If a feature map has been extracted by a fully trained CNN, an error may be propagated to a sub-sample which is an optimum part in which an object of interest is located. However, if the feature map has been extracted by a CNN that has not been fully trained, the error may be propagated to a sub-sample in which the object of interest is not located, and the sub-sample may be learned. This significantly reduces learning efficiency. Due to these characteristics of localization layers, learning using classification layers is performed first.

In addition, even when global average pooling is used, an average value is evenly propagated to all locations in classification layer N 540. Therefore, there is no big difference in the amount of information with global max pooling.

The conventional object localization model 108 based on weakly supervised learning trains the convolutional layers 200 using only the localization layers 340. While the conventional object localization model 108 uses the convolutional layers 200 trained to more than a certain level using a network pre-trained based on another data, it suffers from a reduction in learning efficiency due to structural characteristics of the classification layers 340. For the same reason, it is also difficult to use the conventional object localization model 108 in fields in which the pre-trained network cannot be applied.

On the other hand, the object localization model 106 additionally includes an object classifier which can serve as a learning machine. Therefore, the object localization model 106 can train a CNN having an arbitrary initial value without using a pre-trained network. In addition, learning speed is very high.

The object localization model 106 can also simultaneously perform an object classification task of the classification layers 320 and an object classification task of the localization layers 340. This will now be described with reference to FIG. 13.

Figure 13:
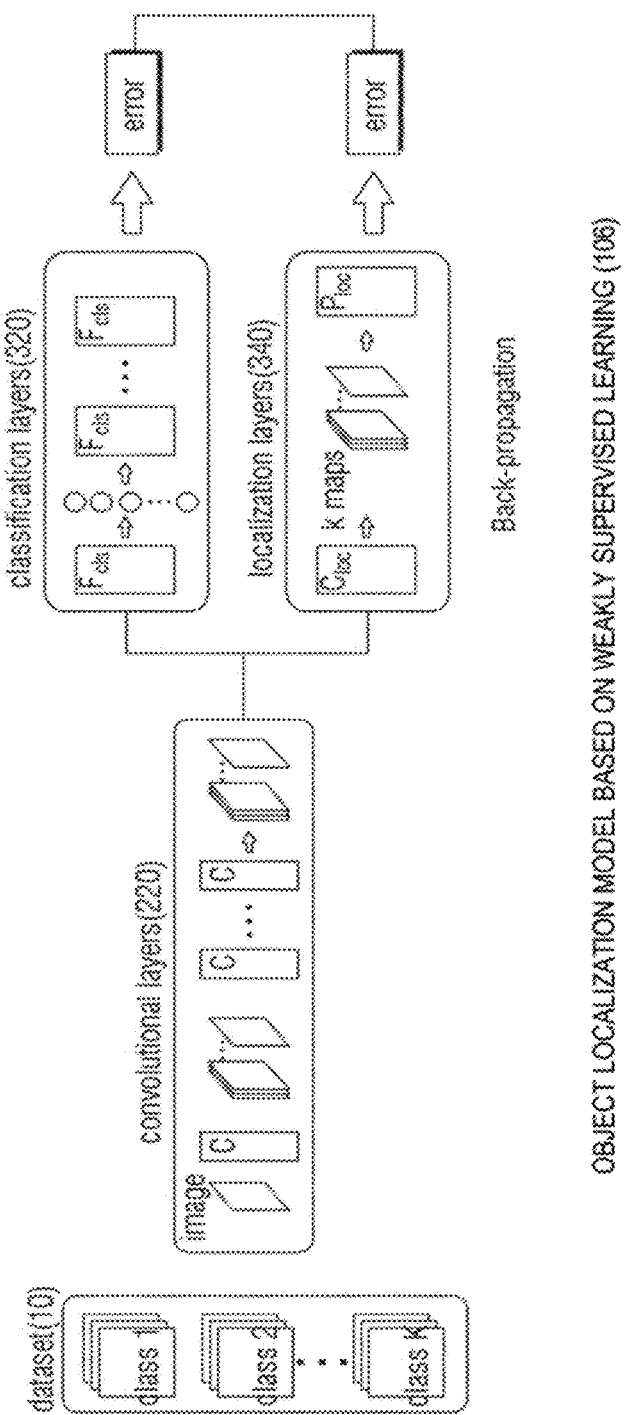
FIG. 13 illustrates an object localization model based on weakly supervised learning, which is referred to in some embodiments.

FIG. 13 illustrates an object localization model 106 based on weakly supervised learning, which is referred to in some embodiments of the present invention.

The object localization model 106 may include a dataset 10, convolutional layers 220, classification layers 320, and localization layers 340. The convolutional layers 220 are network layers to which a CNN has been applied, the classification layers 320 are network layers which perform object classification, and the localization layers 340 are network layers which can perform object classification and extract object location information when performing object classification.

As in FIG. 8, a target task of the object localization model 106 is an object localization task, and given information is class information. Since the given information is the class information only, the classification layers 320 and the localization layers 340 may calculate class probability values by performing object classification and generate error values by comparing the calculated probability values with the given class information. The error values may be used to train the convolutional layers 220.

A task of the classification layers 320 and a task of the localization layers 340 may be performed simultaneously. Here, when errors calculated by the classification layers 320 and the localization layers 340 are back-propagated, a weight may be given to each of the errors in view of relative importance.

Assuming that an error calculated by the classification layers 320 is a first error and that an error calculated by the localization layers 340 is a second error, the object localization model 106 may calculate a third error value by assigning a weight to each of the first error value and the second error value. The relative importance of each error value may be reflected using a weight.

At the initial stage of learning, a greater weight may be applied to the first error. Therefore, a greater weight may be given to training through the classification layers 320. As the convolutional layers 220 are updated by the classification layers 320, they may be trained to have a better weight and bias value.

A smaller weight is given to the second error at the initial stage of learning in order to prevent the localization layers 340 from falling into a sub-sample area in which an object does not exist.

If the first error is $Loss_C$ and if the second error is $Loss_L$, the third error may be defined as follows. Using the value of a, the relative importance of each of the first error value and the second error value may be reflected:

$$Loss_{total} = (1-\alpha)Loss_C + \alpha Loss_L$$

Figure 14:
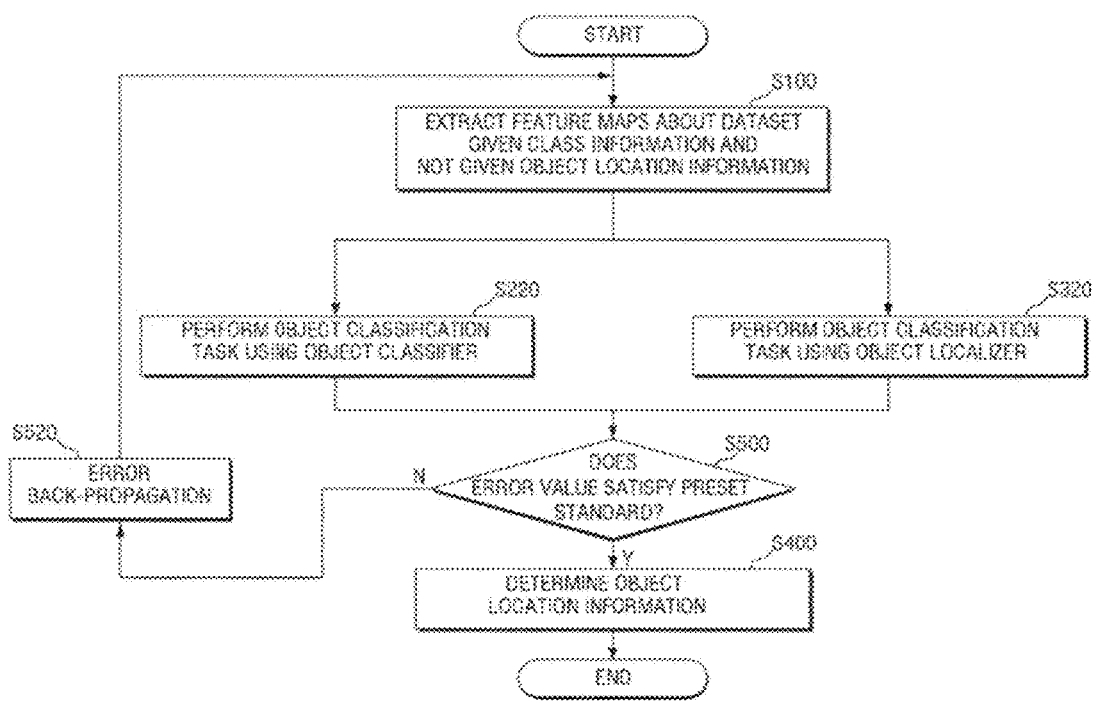
FIG. 14 is a flowchart illustrating an object localization method based on weakly supervised learning, in which training by an object classifier and training by an object localizer are performed simultaneously according to an embodiment.

FIG. 14 is a flowchart illustrating an object localization method based on weakly supervised learning, in which training by an object classifier and training by an object localizer are performed simultaneously according to yet another embodiment of the present invention.

The object localization apparatus 106 may extract feature maps about a dataset given object class information and not given object location information by using a CNN (operation S100).

The object localization apparatus 106 may calculate a first error value by performing an object classification task using an object classifier (operation S220) and calculate a second error value by performing an object classification task using an object localizer (operation S320).

The object localization apparatus 106 may determine whether each of the first error value and the second error value satisfies a preset standard (operation S500). In operation S500, the object localization apparatus 106 may determine whether the CNN has been trained enough for a target task to be performed.

The preset standard may be designated as a particular first error value or as a particular second error value. Alternatively, the preset standard may be designated as a combination of the first error value and the second error value.

If each of the first error value and the second error value satisfies the preset standard, the object localization apparatus 106 may determine the object location information (operation S400). That is, a task of determining the object location information, which is a target task of the object localization apparatus 106, is performed.

On the other hand, if each of the first error value and the second error value does not satisfy the preset standard, the object localization apparatus 106 may train the CNN by back-propagating the first and second error values (operation S520).

In operation S520, the object localization apparatus 106 may train the CNN using both the first error value and the second error value. In addition, at each stage of training, the object localization apparatus 106 may reflect the relative importance of each of the object classifier and the object localizer.

For example, a third error value may be calculated by giving a weight to each of the first error value and the second error value. At the initial stage of training, the object localization apparatus 106 may give a greater weight to the first error value so as to reinforce learning through the object classifier. As the training proceeds, the object localization apparatus 100 may give a greater weight to the second error value.

An example case where the object localization apparatus 106 is applied to the medical field will now be described with reference to FIGS. 15 through 20. The object localization apparatus 106 may perform a target task of recognizing the location of a lesion in a weakly supervised learning environment given information only about the presence or absence of the lesion.

Figure 15:
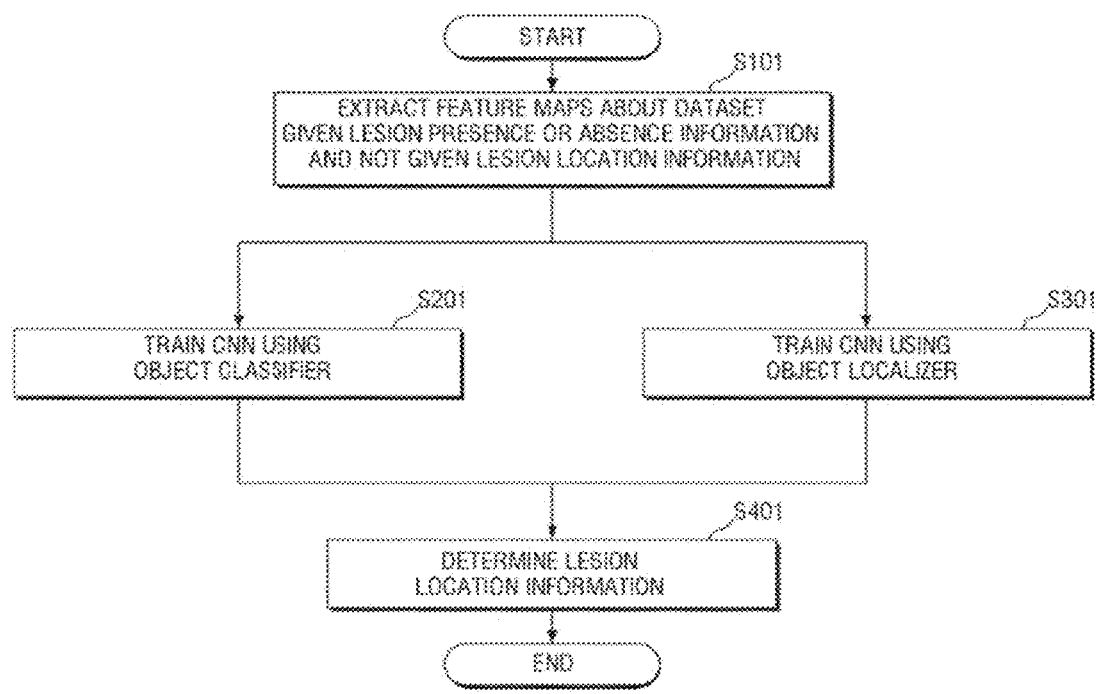
FIG. 15 is a flowchart illustrating a case where an object localization apparatus is applied to the medical field according to an embodiment.

FIG. 15 is a flowchart illustrating a case where an object localization apparatus is applied to the medical field according to yet another embodiment of the present invention.

Referring to FIG. 15, the object localization apparatus 106 may extract feature maps about a medical dataset given lesion presence or absence information and not given lesion location information by using a CNN (operation S101).

To learn the medical dataset, the object localization apparatus 106 may train the CNN using an object classifier (operation S201) and train the CNN using an object localizer (operation S301). If the CNN is fully trained on the medical dataset, the object localization apparatus 106 may determine the lesion location information (operation S400). The determining of the lesion location information in operation S400 may be a target task.

The target task is generally performed by a radiologist. A radiologist finds the location of a lesion by checking medical data with the naked eye and using acquired knowledge. For example, when diagnosing the presence and location of a lesion based on a screening image such as an X-ray image, a radiologist may use knowledge obtained through experience. The radiologist may learn the shapes and patterns of lesions in advance and find lesions having the shapes and patterns.

In the field of radiographic diagnosis, however, there may be shapes and patterns of lesions which have not yet been discovered by humans. In addition, there may be lesion sizes which cannot be detected with the naked eye. Hence, there exists a probability of misdiagnosis. However, a lesion localization task performed using the object localization apparatus 106 can achieve the objective and effect of overcoming these limitations of the conventional diagnosis method.

In operation S101, the lesion presence or absence information given about the medical dataset may be class answer information corresponding to 'normal' or 'abnormal.' The lesion location information may be information that is to be obtained through the execution of the target task (operation S401) and ungiven information about the medical dataset.

In operations S201 and S301, the object localization apparatus 106 may perform a lesion classification (presence or absence) task using the object classifier and the object localizer and generate a value of probability that each piece of medical data will be normal or abnormal as an output.

Once the output is generated, each of the object classifier and the object localizer may calculate an error value by comparing the output with the given lesion presence or absence information. The object localization apparatus 106 may train the CNN by back-propagating the error value.

As described above, the training using the object classifier may be performed before the training using the object localizer is performed. Alternatively, the training using the object classifier and the training using the object localizer can be performed simultaneously.

Through the above process, the CNN can be trained directly on the given medical dataset. Since the CNN is trained directly on data from which the location of a lesion is to be extracted, the target task can be performed with high accuracy.

In addition, the trained CNN can extract good feature maps needed to identify the presence or absence of a lesion and the location of the lesion. In particular, since data labeled only with information about the presence or absence of a lesion is learned to find the location of the lesion, the object localization apparatus 106 may learn the shape, pattern, etc. of the lesion by itself.

Therefore, as machine learning is repeated, the object localization apparatus 106 may discover patterns not yet known to humans and identify patterns that cannot be identified with the naked eye.

In this sense, it is very meaningful to apply weakly supervised learning to the medical field. This is because there is a possibility that a machine will obtain medical knowledge that surpasses current human knowledge. Realizing this possibility is one of the important objectives of the object localization apparatus 106 according to the embodiment of the present invention.

According to a conventional machine learning method in the medical field, a pattern of a lesion is learned based on a dataset labeled in advance with the location of the lesion by a human. Therefore, the objective and effect of the conventional machine learning method are to learn a pattern already discovered by a human. On the other hand, the object localization apparatus 106 according to the embodiment of the present invention learns a pattern of a lesion by itself based on given information about the presence or absence of the lesion. Therefore, the object localization apparatus 106 is not dependent on pattern information already discovered by humans. For this reason, there is a possibility that the object localization apparatus 106 will discover a pattern different from patterns of lesions already known to humans.

Furthermore, the object localization apparatus 106 does not require a large labeled dataset and many types of information for each piece of data. This is because the object localization apparatus 106 can learn a given dataset by itself and extract ungiven information based on given information by using a weakly supervised learning method.

The object localization apparatus 106 can also solve the problem of personal privacy related to medical data. For example, medical data exists in a database of a hospital. Therefore, a learning model for datasets of hospitals can be established using one hospital as one node. In this case, there is no need to take medical data out of a hospital, and only learning results may be transmitted to an external destination. Accordingly, this solves issues related to the use and leakage of personal information.

FIG. 16 illustrates a performance evaluation table of an object localization apparatus based on an actual experimental example.

In an actual experiment, the object localization apparatus 106 was designed to perform a task of determining the location of tuberculosis based on a dataset about X-ray images of the chest. Each X-ray image was labeled with information about the presence or absence of tuberculosis. Both an object classifier and an object localizer used a softmax function and a loss function.

Two test sets, i.e., Shenzhen set and MC set were used. MaxPool and AvePool at the top of the table respectively are result values obtained by applying max pooling and average pooling based on a conventional object localization model. STL+MaxPool and STL+AvePool at the bottom of the table respectively are result values obtained by applying max pooling and average pooling based on an object localization model according to an embodiment of the present invention.

The conventional object localization model used in the current experiment is different from the above-described model 108. Unlike the model 108, the conventional object localization model used in the current experiment uses a CNN in an arbitrary initialization state instead of a pretrained network. Therefore, the effect of adding a classifier as a learning device to the inventive model 106, which uses a CNN in the same initialization state as that of the CNN used by the conventional object localization model, can be validated in the current experiment.

Referring to the results of classification and localization tasks, the accuracy of the two tasks improved in the object localization model compared with the conventional model. In particular, the accuracy of the localization task, which is a target task, increased significantly, which proves the effect of the present invention.

Figure 17:
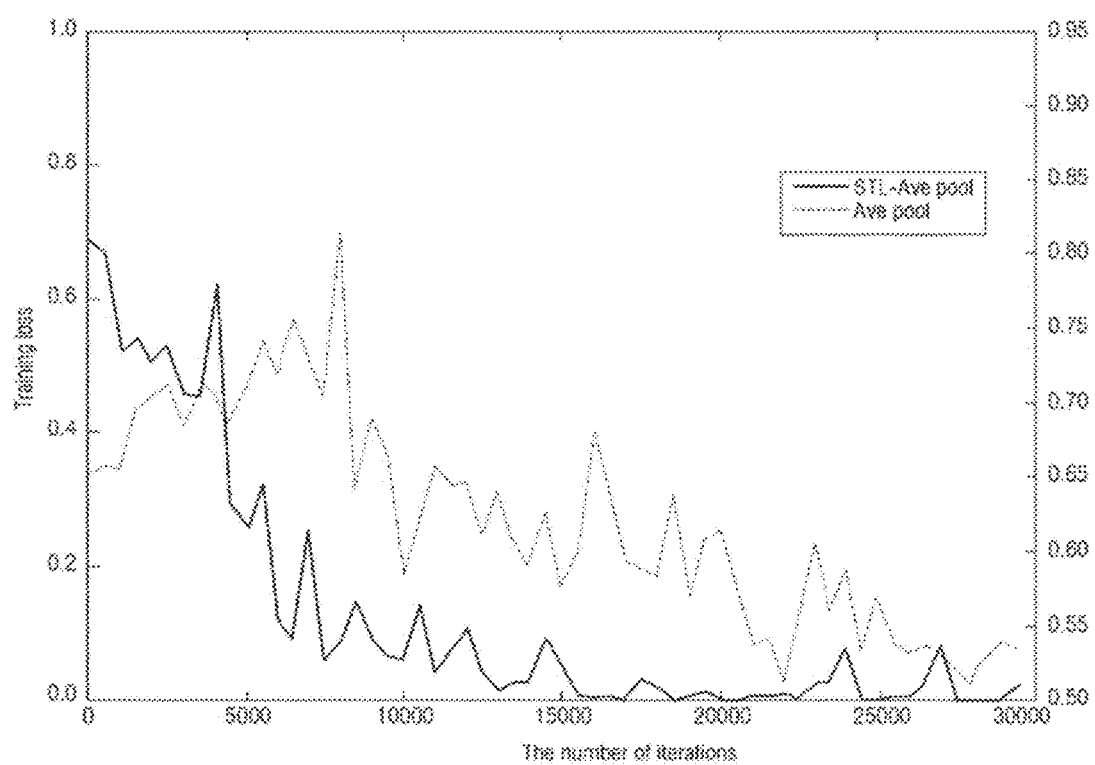
FIGS. 17 and 18 are graphs illustrating the performance of an object localization apparatus based on an actual experimental example.
Figure 18:
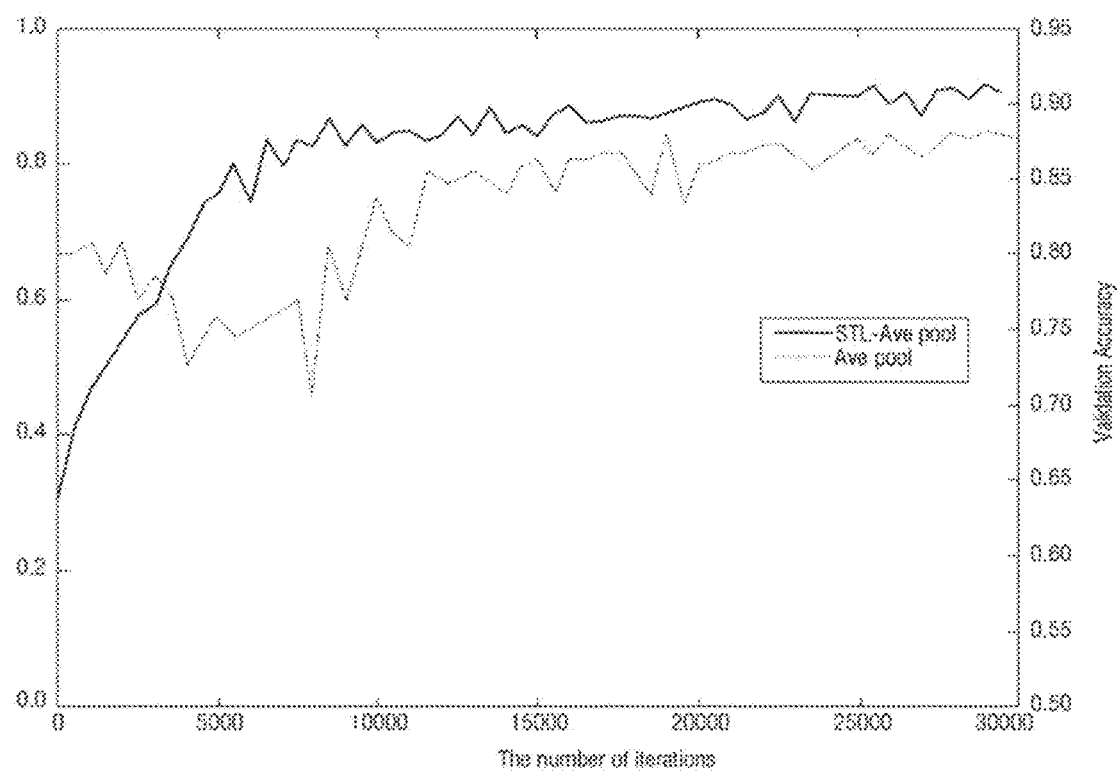

FIGS. 17 and 18 are graphs illustrating the performance of an object localization apparatus based on an actual experimental example.

The graph of FIG. 17 illustrates, as training proceeds, the variation in the error value of each of a conventional object localization apparatus and an object localization apparatus according to the present invention, and the graph of FIG. 18 illustrates, as training proceeds, the variation in the measured accuracy of object localization of each of the conventional object localization apparatus and the object localization apparatus according to the present invention.

A solid line indicates a case where average pooling was applied to the object localization apparatus according to the inventive concept, and a dotted line indicates a case where average pooling was applied to the conventional object localization apparatus.

As apparent from the graphs, the object localization apparatus according to the present invention is faster in reducing errors or increasing accuracy than the conventional object localization apparatus.

Figure 19:
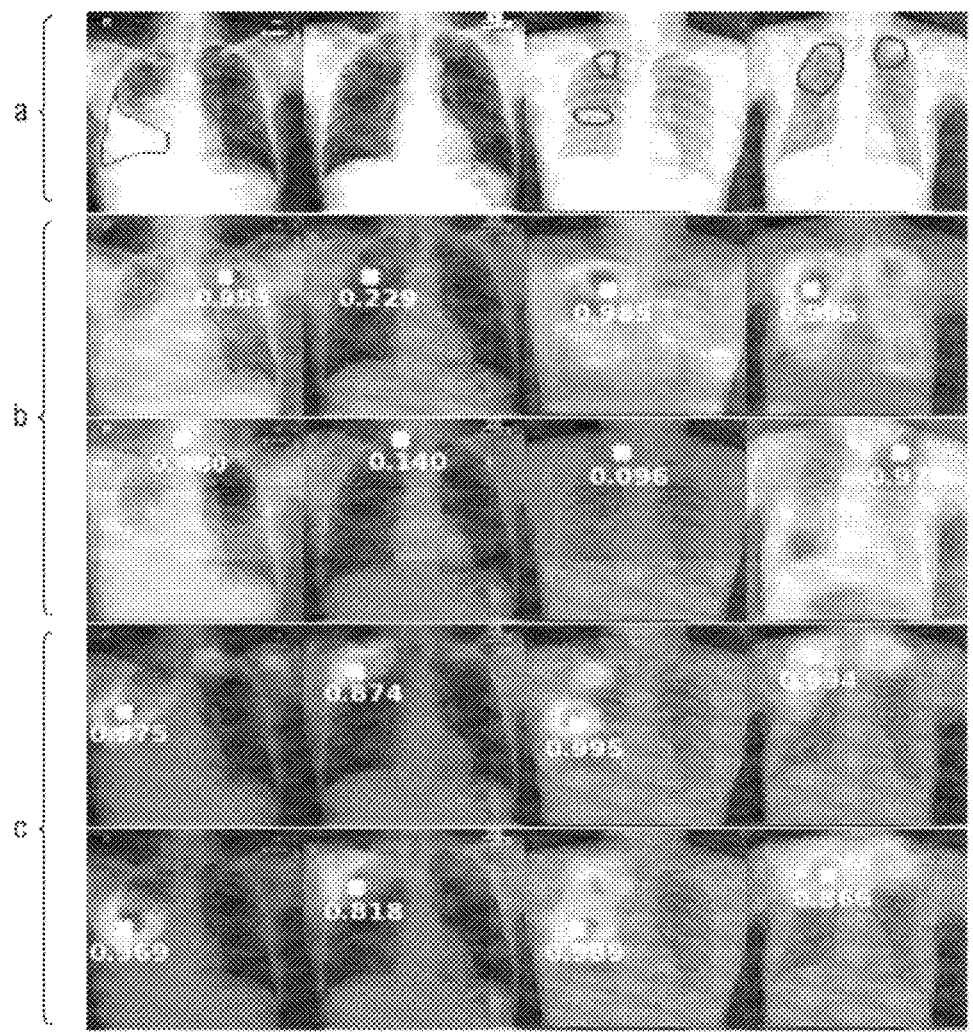
FIGS. 19 and 20 show images obtained as a result of actually performing object localization.
Figure 20:
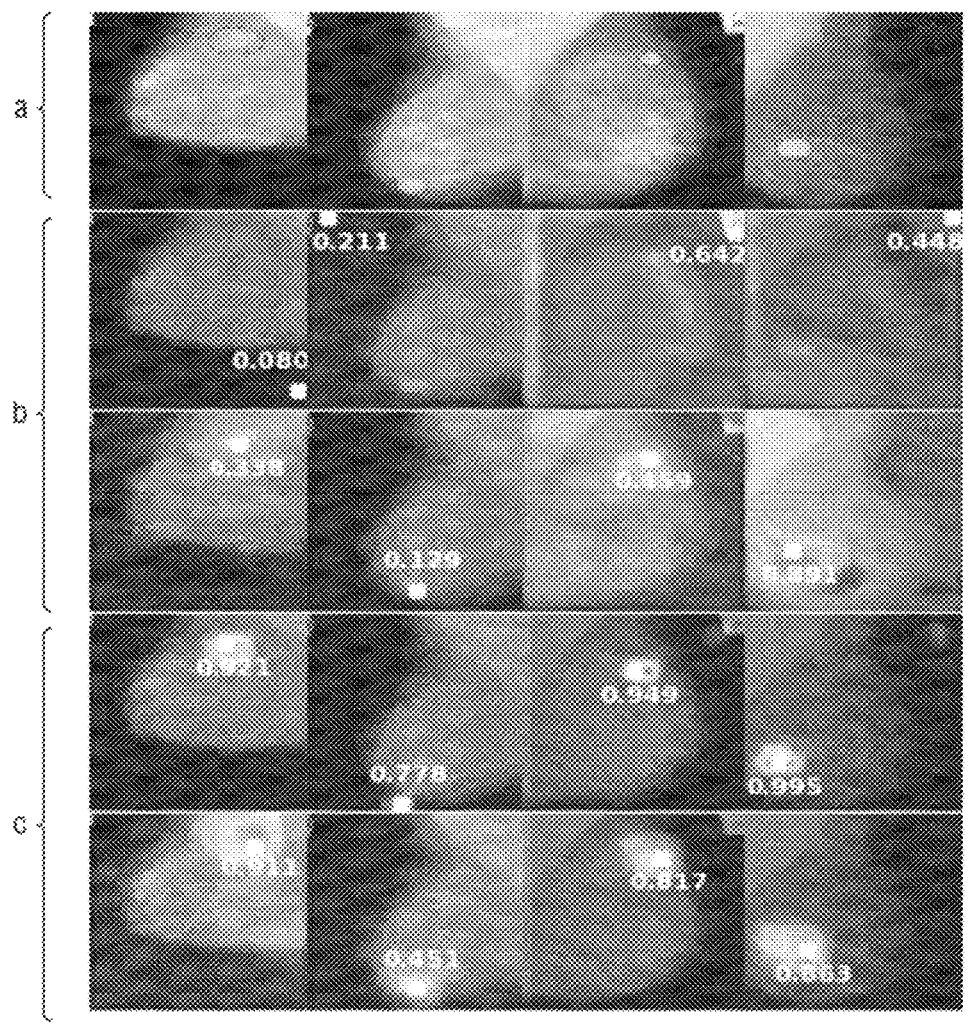

FIGS. 19 and 20 show images obtained as a result of actually performing object localization.

Images shown in FIGS. 19 and 20 are images of abnormal patients, that is, images containing lesions. Numbers shown are values of probability that a lesion will exist, and regions marked are locations where lesions are located. FIG. 19 shows X-ray images of the chest of a patient with tuberculosis, and FIG. 20 shows mammogram images of a breast of a patient with a breast cancer.

Data in area a is data about the location of a lesion provided by a radiologist, and data in area b is result data extracted by a conventional object localization model, and data in area c is result data extracted by an object localization model of the present invention.

A region determined to be the location of a lesion in the images of both area b and area c roughly matches a region marked as the location of the lesion in the data of area a provided by the radiologist. However, the determined region marked in the images of area c is more concentrated at the location of the lesion, and has a very high probability value.

Therefore, improved accuracy can be observed visually. In addition, in the images of area c, a region indicating a location is marked without numbers. Although this region was not used to determine the presence or absence of the lesion, it can be seen that the location of the lesion was accurately extracted as compared with the images of area a. That is, it can be understood that an object localization apparatus of the present invention can extract locations of multiple lesions.

The methods according to embodiments of the present invention described until now may be performed by the execution of a computer program implemented as computer-readable code. The computer program may be transmitted from a first computing device to a second computing device through a network such as the Internet and then installed in the second computing device for use. Each of the first computing device and the second computing device may be a fixed computing device such as a server, a physical server that belongs to a server pool for a cloud service, or a desktop PC.

While embodiments of the present invention have been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A machine learning method based on weakly supervised learning, the method performed by a machine learning apparatus and comprising:
    extracting feature maps about a dataset given a first type of information as answer information and not given a second type of information as answer information by using a convolutional neural network (CNN), the first type of information and the second type of information being different types of information in a computer vision field;
    calculating a first error value by performing a task corresponding to the first type of information by using a first model and the feature maps, the task corresponding to the first type of information including a task which is performed to output an output corresponding to the first type of information; and
    calculating a second error value by performing the task corresponding to the first type of information by using a second model and the feature maps, the second model performing the task in processes different from those of the first model;
    calculating a first relative importance of the first error by multiplying a first weight and the first error value;
    calculating a second relative importance of the second error by multiplying a second weight and the second error value;
    calculating a third error value based on the calculated first relative importance and the calculated second relative importance;
    training the CNN by back-propagating the third error value;
    increasing the second weight and decreasing the first weight as update of the CNN proceeds;
    determining whether the first error value and the second error value of the trained CNN satisfy a preset standard; and
    when at least one of the first error value and the second error value of the trained CNN satisfies the preset standard, performing the task corresponding to the first type of information using the trained CNN and the second model to extract the second type of information.

2. The method of claim 1, further comprising adjusting the first weight and the second weight to reflect relative importance of each of the first model and the second model.

3. A machine learning method based on weakly supervised learning, the method performed by a machine learning apparatus and comprising:
    extracting feature maps about a dataset given object class information as answer information and not given object location information as answer information by using a convolutional neural network (CNN);
    training the CNN by back-propagating a first error value calculated as a result of performing an object classification task by using an object classifier and the feature maps, the object classification task including a task which is performed to output an output corresponding to the object class information; and
    training the CNN by back-propagating a second error value calculated as a result of performing the object classification task by using an object localizer and the feature maps;
    calculating a first relative importance of the first error by multiplying a first weight and the first error value;
    calculating a second relative importance of the second error by multiplying a second weight and the second error value;
    calculating a third error value based on the calculated first relative importance and the calculated second relative importance;
    training the CNN by back-propagating the third error value; and
    increasing the second weight and decreasing the first weight as update of the CNN proceeds;
    determining whether the first error value and the second error value of the trained CNN satisfy a preset standard; and
    when at least one of the first error value and the second error value of the trained CNN satisfies the preset standard, extracting the object location information by performing the object classification task using the trained CNN and the object localizer.

4. The method of claim 3, wherein the object class information is information about the presence or absence of a lesion, and the object location information is location information of the lesion.

5. The method of claim 3, wherein a dataset is a medical dataset.

6. The method of claim 3, wherein the training the CNN by back-propagating a first error value calculated as a result of performing an object classification task comprises:
    determining whether the first error value satisfies a preset reference value; and
    updating the CNN by back-propagating the second error value calculated as a result of performing the object classification task by using the object localizer only when the first error value satisfies the preset reference value.

7. The method of claim 3, further comprising determining the object location information about the dataset by using the object localizer.

8. A machine learning apparatus based on weakly supervised learning, the apparatus comprising:
    one or more processors;
    a memory which loads a computer program executed by the processors; and
    a storage, wherein the computer program comprises:
    a feature map extraction operation of extracting feature maps about a dataset given a first type of information as answer information and not given a second type of information as answer information by using a convolutional neural network (CNN), the first type of information and the second type of information being different types of information in a computer vision field;

a first learning operation of training the CNN by back-propagating a first error value calculated as a result of performing a task corresponding to the first type of information by using a first model and the feature maps, the task corresponding to the first type of information including a task which is performed to output an output corresponding to the first type of information;

a second learning operation of training the CNN by back-propagating a second error value calculated as a result of performing the task corresponding to the first type of information by using a second model and the feature maps, the second model performing the task in processes different from those of the first model;

a third learning operation of training the CNN by back-propagating a third error value based on calculating a first relative importance of the first error and calculating a second relative importance of the second error, wherein calculating the first relative importance of the first error comprises multiplying a first weight and the first error value and calculating the second relative importance of the second error comprises multiplying a second weight and the second error value, and increasing the second weight and decreasing the first weight as update of the CNN proceeds;

an operation of determining whether the first error value and the second error value of the trained CNN satisfy a preset standard; and an operation of, when at least one of the first error value and the second error value of the trained CNN satisfies the preset standard, extracting the second type of information by performing the task corresponding to the first type of information using the trained CNN and the second model.

9. The apparatus of claim 8, wherein the first learning operation determines whether the first error value satisfies a preset reference value and updates the CNN by back-propagating the second error value calculated as a result of performing the task corresponding to the first type of information only when the first error value satisfies the preset reference value.

* * * * *